US006628513B1

(12) United States Patent
Gallagher et al.

(10) Patent No.: US 6,628,513 B1
(45) Date of Patent: Sep. 30, 2003

(54) MASS STORAGE DEVICE MOUNTING SYSTEM

(75) Inventors: Brian Gallagher, Southboro, MA (US);
Jeffrey Teachout, Upton, MA (US);
Thomas Linnell, Northboro, MA (US);
Bernard Warnakulasooriya, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 36 days.

(21) Appl. No.: 09/877,808

(22) Filed: Jun. 7, 2001

(51) Int. Cl.[7] ................................................. G06F 1/16
(52) U.S. Cl. .................... 361/685; 361/725; 361/802; 361/741; 361/686; 439/928.1
(58) Field of Search ................................ 361/683–685, 361/724, 735, 728–733, 725–727, 747; 360/97.01, 98.01, 137; 312/332.1, 333, 223.2; 369/75.1–82; 439/152–160, 928, 928.1

(56) References Cited

U.S. PATENT DOCUMENTS

| 5,398,158 | A | * | 3/1995 | Fisher et al. ............. 360/97.01 |
| 5,579,204 | A | | 11/1996 | Nelson et al. |
| 5,602,717 | A | | 2/1997 | Leshem et al. |
| 5,668,696 | A | * | 9/1997 | Schmitt ..................... 361/683 |
| 5,729,763 | A | | 3/1998 | Leshem |
| 5,737,189 | A | * | 4/1998 | Kammersgard et al. . 312/107.5 |
| 5,737,193 | A | | 4/1998 | LaRiviere et al. |
| 5,768,551 | A | | 6/1998 | Bleiweiss et al. |
| 5,822,184 | A | * | 10/1998 | Rabinovitz ................. 361/685 |
| 5,841,997 | A | | 11/1998 | Bleiweiss et al. |
| 5,887,270 | A | | 3/1999 | Brant et al. |
| 5,898,828 | A | | 4/1999 | Pignolet et al. |
| 5,984,634 | A | | 11/1999 | Teachout et al. |
| 6,009,535 | A | | 12/1999 | Halligan et al. |
| 6,061,966 | A | | 5/2000 | Nelson et al. |
| 6,078,503 | A | | 6/2000 | Gallagher et al. |
| 6,088,224 | A | | 7/2000 | Gallagher et al. |
| 6,169,249 | B1 | | 1/2001 | Teachout et al. |
| 6,199,839 | B1 | | 3/2001 | Rienzo |
| 6,201,692 | B1 | * | 3/2001 | Gamble et al. .......... 312/223.3 |
| 6,272,010 | B1 | * | 8/2001 | Schmitt ..................... 361/685 |
| 6,292,360 | B1 | * | 9/2001 | Carteau .................... 361/679 |
| 6,317,334 | B1 | * | 11/2001 | Abruzzini et al. .......... 361/797 |

* cited by examiner

Primary Examiner—Darren Schuberg
Assistant Examiner—Anthony Q Edwards
(74) Attorney, Agent, or Firm—Chapin & Huang, L.L.C.; David E. Huang, Esq.

(57) ABSTRACT

A system is provided that may be used to mount mass storage devices so that they may be used in a mass storage system. The mass storage devices may include respective disk storage devices. Each of the disk storage devices may have a respective form factor that may be a respective one of two possible form factors (e.g., low profile or half-height form factor).

15 Claims, 13 Drawing Sheets

MASS STORAGE DEVICE MOUNTING SYSTEM

CROSS-REFERENCE TO RELATED APPLICATIONS

The subject matter of the subject application is related to the subject matter of the following co-pending U.S. patent applications:

U.S. patent application Ser. No. 09/877,869, entitled "Address Mapping In Mass Storage Device Mounting System," filed concurrently with the subject application;

U.S. patent application Ser. No. 09/877,848, entitled "Configurable Fiber Channel Loop System," filed concurrently with the subject application;

U.S. patent application Ser. No. 09/343,344, entitled, "Fibre Channel By-Pass," filed Jun. 30, 1999; and U.S. patent application Ser. No. 09/473,668, entitled, "Fibre Channel Data Storage System," filed Dec. 29, 1999.

Each of these co-pending U.S. patent applications is owned by the owner of the subject application; the respective disclosure of each of these co-pending U.S. patent applications is hereby incorporated by reference in its entirety into the subject application.

BACKGROUND OF THE INVENTION

1. Field of the Invention

The present invention relates generally to a system that may be used to mount mass storage devices for use in a mass storage system (e.g., a network mass storage system), and more specifically, to such a mounting system wherein the mass storage devices mounted in the mounting system may comprise disk mass storage devices that have two different form factors.

2. Brief Description of Related Prior Art

Network computer systems generally include a plurality of geographically separated or distributed computer nodes that are configured to communicate with each other via, and are interconnected by, one or more network communications media. One conventional type of network computer system includes a network storage subsystem that is configured to provide a centralized location in the network at which to store, and from which to retrieve data. Advantageously, by using such a storage subsystem in the network, many of the network's data storage management and control functions may be centralized at the subsystem, instead of being distributed among the network nodes.

One type of conventional network storage subsystem, manufactured and sold by the Assignee of the subject application (hereinafter "Assignee") under the tradename Symmetrix™ (hereinafter referred to as the "Assignee's conventional storage system"), includes a plurality of disk mass storage devices (e.g., disk drives) configured as one or more redundant arrays of independent (or inexpensive) disks (RAID). The disk devices are controlled by disk controllers (commonly referred to as "back end" controllers/directors) that are coupled via a bus system to a shared cache memory resource in the subsystem. The cache memory resource is also coupled via the bus system to a plurality of host controllers (commonly referred to as "front end" controllers/directors). The disk controllers are coupled to respective disk adapters that, among other things, interface the disk controllers to the disk devices. Similarly, the host controllers are coupled to respective host channel adapters that, among other things, interface the host controllers via channel input/output (I/O) ports to the network communications channels (e.g., SCSI, Enterprise Systems Connection (ESCON), or Fibre Channel (FC) based communications channels) that couple the storage subsystem to computer nodes in the computer network external to the subsystem (commonly termed "host" computer nodes or "hosts").

In the Assignee's conventional storage system, the disk devices are placed in respective housings and stored in one or more chassis. The chassis includes a multiplicity of sets of slots for receiving respective housings within which the respective disk devices are placed. The chassis also includes an electrical back plane having a multiplicity of electromechanical connectors. The connectors may be mated with respective electromechanical connectors of the housings to electrically and mechanically couple the disk devices to the chassis, and thereby, mount the disk devices in the chassis.

In general, two types of commercially available disk devices may be mounted in the chassis used in the Assignee's conventional storage system: "low profile" and "half-high" form factor disk devices. With the exception of their respective heights, a low profile form factor disk device (hereinafter "LP device") may have identically the same dimensions as a half-high form factor disk device (hereinafter "HH device"). An LP device may have a height of 1 inch; an LP device may have a height of 1.6 inches.

At present, the storage capacity of an HH device may be approximately twice that of an LP device. However, the speed with which data may be read from or written to an HH device may be slower than the speed with which data may be read from or written to an LP device.

Only two types of chassis may be used in the Assignee's conventional storage system. One type of chassis is configured to receive and mount only LP devices, and the other type of chassis is configured to receive and mount only HH devices. Thus, in the Assignee's conventional storage system, a single chassis cannot contemporaneously receive and store both LP and HH devices; instead, all of the disk devices stored in a single chassis in the Assignee's conventional storage system must have a single form factor (i.e., LP or HH).

This is unfortunate, since, given the above-described relative differences in the capabilities of HH and LP devices, in certain practical applications of a data storage system, it may be desirable to store in an individual chassis combinations of both HH and LP devices that, when taken together, may permit the overall performance of the system to be improved. Also unfortunately, since an individual chassis used in the Assignee's conventional data storage system is unable to receive and store disk devices having multiple different form factors, this inherently reduces the design flexibility of the data storage system. Thus, it would be desirable to provide a mass storage device mounting system that may utilize a single type of chassis that is able to contemporaneously receive and store disk mass storage devices that have different form factors (e.g., receive and store different configurations/combinations of both HH and LP devices).

SUMMARY OF THE INVENTION

Accordingly, in broad concept, a mass storage device mounting system is provided that overcomes these and other disadvantages and drawbacks of the prior art. In one embodiment of the mounting system of the present invention, each of the mass storage devices that may be received and stored in the mounting system may comprise a respective housing or carrier device that is attached to, and at least partially encloses, a respective disk storage device (e.g., a disk drive). Each disk storage device may have a respective form factor, which form factor may be a respective one of two different possible form factors (e.g., either HH or LP).

At least one chassis may be included in the mounting system of this embodiment. The chassis may include a plurality of sets of tracks that are configured so as to be able to receive and engage the mass storage devices. The tracks may be disposed in a space defined by the chassis for receiving and storing the mass storage devices.

The chassis may also include an electrical back plane. The back plane may include a multiplicity of connectors that may be used to mount the mass storage devices in and to the chassis. Each of the connectors may be associated with a respective set of tracks in the chassis.

The tracks and the connectors may be configured such that (e.g., constructed and dimensioned), when one set of tracks receives and engages one of the mass storage devices, the mass storage device being engaged by that set of tracks may be slid along and guided by the set of tracks into mounting connection with a connector with which the set of tracks is associated.

The mass storage devices may be grouped into respective subsets, and the space defined by the chassis may include a plurality of equally sized regions. All of the disk devices in each respective subset of mass storage devices may have the same respective form factor. The tracks and the connectors may also be configured so as to permit one or more of the respective subsets of the mass storage devices to be mounted in one or more respective equally sized regions.

If the form factor of the disk devices in a given subset of mass storage devices is a certain one (e.g., HH) of the two possible form factors of the disk devices, then at most two respective mass storage devices may be comprised in the given subset. Conversely, if the form factor of the disk devices in the given subset of mass storage devices is the other (e.g., LP) of the two possible form factors of the disk devices, then at most three respective mass storage devices may be comprised in the given subset of mass storage devices.

Each respective carrier device may include two respective mutually oppositely facing surfaces. Members or projections may extend or project from these surfaces and may be inserted into and engaged by certain sets of tracks. Also in this embodiment, the number of connectors may be equal to M, and the maximum number of mass storage devices that may be mounted in the chassis may be equal to N, with M being greater than N.

The mounting system may include a plurality of chassis. The tracks may be formed in one or more sets of associated racks comprised in each of the chassis. Each set of associated racks may define two respective equally sized regions.

Thus, the mass storage device mounting system of the present invention may utilize a single type of chassis that is able to receive and store combinations of disk mass storage devices that have two different respective form factors (e.g., receive and store combinations of both HH and LP devices). Advantageously, by appropriately selecting the respective combinations of disk devices to be stored in the chassis, the overall performance of a data storage system that comprises the mounting system of the present invention may be improved compared to the prior art. Also advantageously, since a chassis used in the mounting system of the present invention is able to receive and store disk devices having multiple different form factors, this inherently improves the design flexibility of a data storage system that comprises the mounting system of the present invention compared to the prior art.

These and other features and advantages of the present invention will become apparent as the following Detailed Description proceeds and upon reference to the Figures of the Drawings, in which like numerals depict like parts, and wherein:

Although the following Detailed Description will proceed with reference being made to illustrative embodiments and methods of use of the present invention, it should be understood that it is not intended that the present invention be limited to these illustrative embodiments and methods of use. On contrary, many alternatives, modifications, and equivalents of these illustrative embodiments and methods of use will be apparent to those skilled in the art. Accordingly, the present invention should be viewed broadly as encompassing all such alternatives, modifications, and equivalents as will be apparent to those skilled in art, and should be viewed as being defined only as forth in the hereinafter appended claims.

DETAILED DESCRIPTION OF ILLUSTRATIVE EMBODIMENTS

Figure 1:
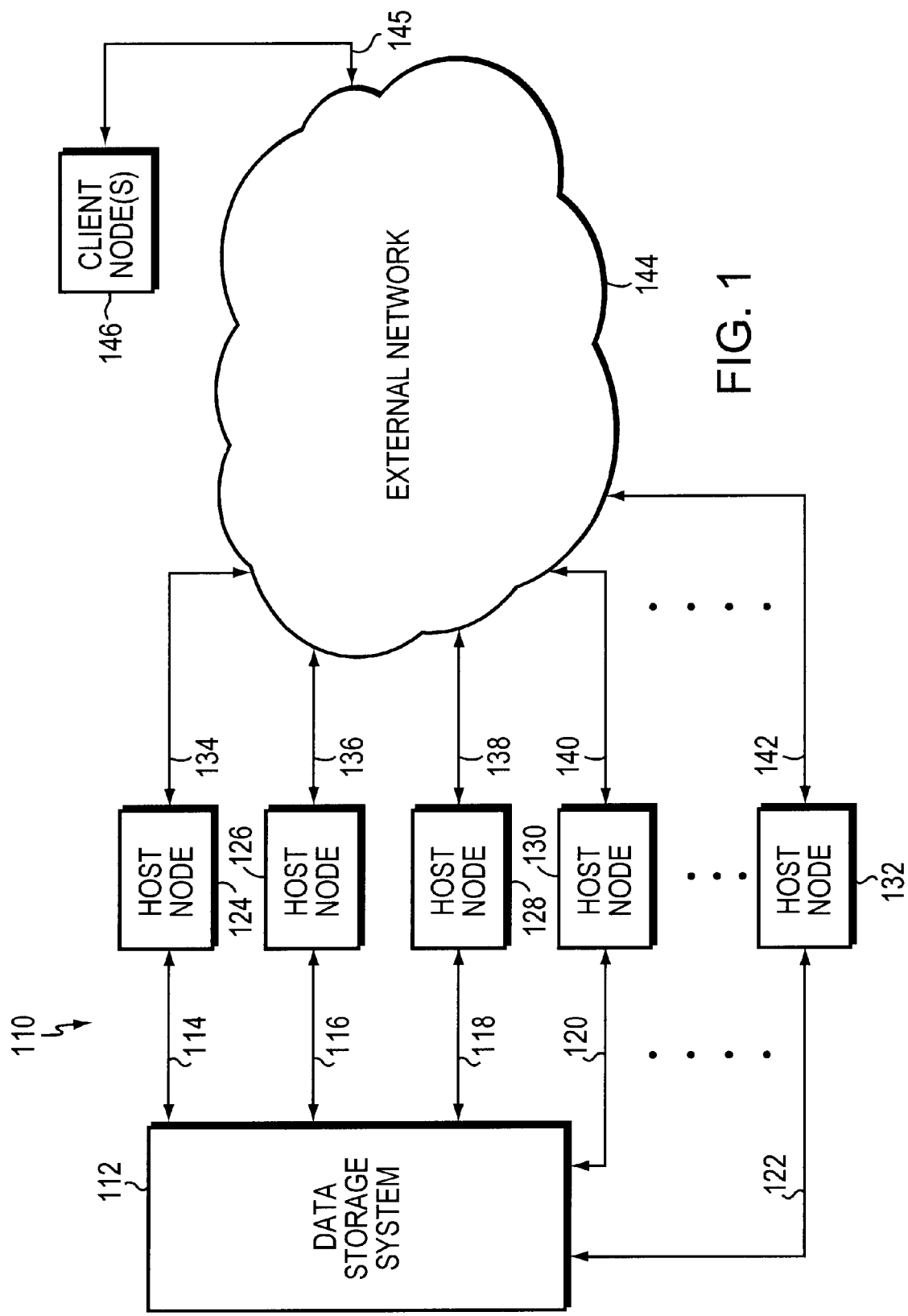
FIG. 1 is a high-level schematic block diagram of a data storage network that includes a data storage system wherein one embodiment of the present invention may be practiced to advantage.

Turning now to FIGS. 1–13, illustrative embodiments of the present invention will be described. FIG. 1 is a high level block diagram illustrating a data storage network 110 that includes a data storage system 112 wherein one embodiment of the subject invention may be practiced to advantage. System 112 is coupled via FC protocol optical communication links 114, 116, 118, 120, . . . 122 to respective host computer nodes 124, 126, 128, 130, . . . 132. Host nodes 124, 126, 128, 130, . . . 132 are also coupled via additional respective conventional network communication links 134, 136, 138, 140, . . . 142 to an external network 144. Network 144 may comprise one or more Transmission Control Protocol/Internet Protocol (TCP/IP)-based and/or Ethernet-based local area and/or wide area networks. Network 144 is also coupled to one or more client computer nodes (collectively or singly referred to by numeral 146 in FIG. 1) via network communication links (collectively referred to by numeral 145 in FIG. 1). The network communication protocol or protocols utilized by the links 134, 136, 138, 140, . . . 142, and 145 are selected so as to ensure that the nodes 124, 126, 128, 130, . . . 132 may exchange data and commands with the nodes 146 via network 144.

Host nodes 124, 126, 128, 130, . . . 132 may be any one of several well known types of computer nodes, such as server computers, workstations, or mainframes. In general, each of the host nodes 124, 126, 128, 130, . . . 132 and client nodes 146 comprises a respective computer-readable memory (not shown) for storing software programs and data structures associated with, and for carrying out the functions and operations described herein as being carried by these nodes 124, 126, 128, 130, . . . 132, and 146. In addition, each of the nodes 124, 126, 128, 130, . . . 132, and 146 further includes one or more respective processors (not shown) and network communication devices for executing these software programs, manipulating these data structures, and for permitting and facilitating exchange of data and commands among the host nodes 124, 126, 128, 130, . . . 132 and client nodes 146 via the communication links 134, 136, 138, 140, . . . 142, network 144, and links 145. The execution of the software programs by the processors and network communication devices included in the hosts 124, 126, 128, 130, . . . 132 also permits and facilitates exchange of data and commands among the nodes 124, 126, 128, 130, . . . 132 and the system 112 via the FC links 114, 116, 118, 120, . . . 122, in the manner that will be described below.

Figure 2:
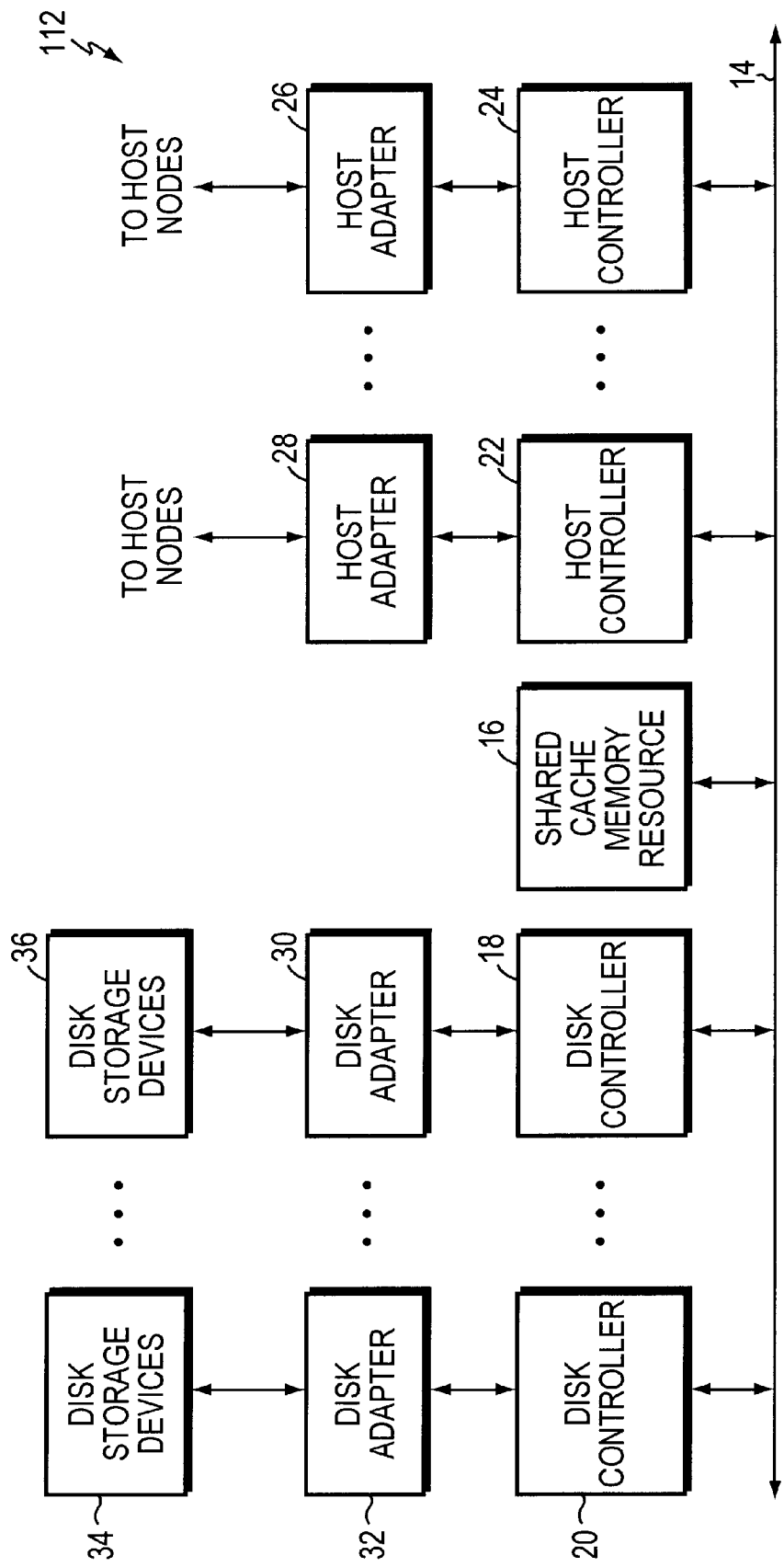
FIG. 2 is a high-level schematic block diagram illustrating functional components of the data storage system included in the data storage network shown in FIG. 1.

FIG. 2 is a high-level schematic block diagram of functional components of the system 112. System 112 may include a bus system 14 that electrically couples together a plurality of host controllers 22 . . . 24, a plurality of disk controllers 18 . . . 20, and a shared cache memory resource 16. Bus system 14 may include a plurality of redundant buses (not shown) and a bus arbitration and control system (also not shown).

Each host controller 22 . . . 24 may comprise a single respective circuit board or panel. Likewise, each disk controller 18 . . . 20 may comprise a single respective circuit board or panel. Each disk adapter 30 . . . 32 may comprise a single respective circuit board or panel. Likewise, each host adapter 26 . . . 28 may comprise a single respective circuit board or panel. Each host controller 22 . . . 24 may be electrically and mechanically coupled to a respective host adapter 28 . . . 26, respectively, via a respective mating electromechanical coupling system.

In this embodiment of system 112, although not shown explicitly in the Figures, each host adapter 26 . . . 28 may be coupled to four respective host nodes via respective FC links. For example, in this embodiment of system 112, adapter 26 may be coupled to host nodes 124, 126, 128, 130 via respective FC links 114, 116, 118, 120. It should be appreciated that the number of host nodes to which each host adapter 26 . . . 28 may be coupled may vary, depending upon the particular configurations of the host adapters 26 . . . 28, and host controllers 22 . . . 24, without departing from the present invention.

Disk adapter 32 is electrically coupled to a set of mass storage devices 34, and interfaces the disk controller 20 to those devices 34 so as to permit exchange of data and commands between processors (not shown) in the disk controller 20 and the storage devices 34. Disk adapter 30 is electrically coupled to a set of mass storage devices 36, and interfaces the disk controller 18 to those devices 36 so as to permit exchange of data and commands between processors (not shown) in the disk controller 18 and the storage devices 36. The devices 34 . . . 36 may be configured as redundant arrays of disk mass storage devices.

It should be appreciated that the respective numbers of the respective functional components of system 112 shown in FIG. 2 are merely for illustrative purposes, and depending upon the particular application to which the system 112 is intended to be put, may vary without departing from the present invention. It may be desirable, however, to permit the system 112 to be capable of failover fault tolerance in the event of failure of a particular component in the system 112. Thus, in practical implementation of the system 112, it may be desirable that the system 112 include redundant functional components and a conventional mechanism for ensuring that the failure of any given functional component is detected and the operations of any failed functional component are assumed by a respective redundant functional component of the same type as the failed component. For example, the controller 18 may be paired with another disk controller (not shown) for purposes of redundancy failover in the event of failure of either controller 18 or the not shown other controller, in the manner described in the aforesaid copending U.S. patent application Ser. No. 09/877,848, entitled, "Configurable Fiber Channel Loop System," filed concurrently with the subject application.

The general manner in which data may be retrieved from and stored in the system 112 will now be described. Broadly speaking, in operation of network 110, a client node 146 may forward a request to retrieve data to a host node (e.g., node 124) via one of the links 145 associated with the client node 146, network 144 and the link 134 associated with the host node 124. If data being requested is not stored locally at the host node 124, but instead, is stored in the data storage system 112, the host node 124 may request the forwarding of that data from the system 112 via the FC link 114 associated with the node 124.

The request forwarded via link 114 is initially received by the host adapter 26 coupled to that link 114. The host adapter 26 associated with link 114 may then forward the request to the host controller 24 to which it is coupled. In response to the request forwarded to it, the host controller 24 may then ascertain from data storage management tables (not shown) stored in the cache 16 whether the data being requested is currently in the cache 16; if the requested data is currently not in the cache 16, the host controller 24 may request that the disk controller (e.g., controller 18) associated with the storage devices 36 within which the requested data is stored retrieve the requested data into the cache 16. In response to the request from the host controller 24, the disk controller 18 may forward via the disk adapter to which it is coupled appropriate commands for causing one or more of the disk devices 36 to retrieve the requested data. In response to such commands, the devices 36 may forward the requested data to the disk controller 18 via the disk adapter 30. The disk controller 18 may then store the requested data in the cache 16.

When the requested data is in the cache 16, the host controller 22 may retrieve the data from the cache 16 and forward it to the host node 124 via the adapter 26 and link 114. The host node 124 may then forward the requested data to the client node 146 that requested it via the link 134, network 144 and the link 145 associated with the client node 146.

Additionally, a client node 146 may forward a request to store data to a host node (e.g., node 124) via one of the links 145 associated with the client node 146, network 144 and the link 134 associated with the host node 124. The host node 124 may store the data locally, or alternatively, may request the storing of that data in the system 112 via the FC link 114 associated with the node 124.

The data storage request forwarded via link 114 is initially received by the host adapter 26 coupled to that link 114. The host adapter 26 associated with link 114 may then forward the data storage request to the host controller 24 to which it is coupled. In response to the data storage request forwarded to it, the host controller 24 may then initially store the data in cache 16. Thereafter, one of the disk controllers (e.g., controller 18) may cause that data stored in the cache 16 to be stored in one or more of the data storage devices 36 by issuing appropriate commands for same to the devices 36 via the adapter 30.

Figure 3:
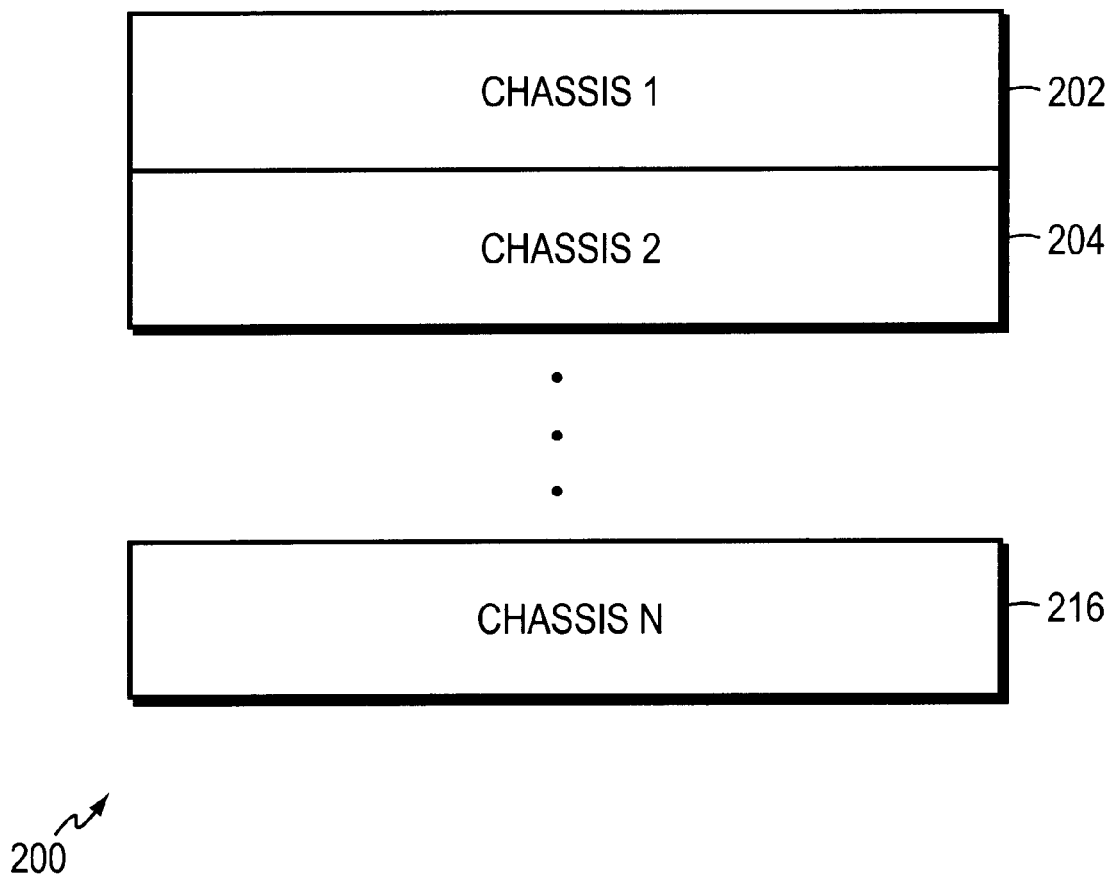
FIG. 3 is a schematic diagram illustrating features of a mounting system according to one embodiment of the present invention.

With particular reference being made to FIGS. 3–13, illustrative embodiments of the present invention will now be described. One or more of the sets of disk devices 34 . . . 36 in system 112 is stored and mounted in at least one disk device mounting system 200. As shown in FIG. 3, depending upon the number of disk devices stored in mounting system 200, system 200 may comprise one disk mounting chassis 202, or a plurality of such chassis 202, 204, . . . 216. The respective construction and operation of each respective chassis 202, 204, . . . 216 are substantially identical. Accordingly, for purposes of avoiding unnecessary duplication of description, the construction and operation of one 202 of the chassis in mounting system 200 will be described herein, with particular reference being made to FIGS. 4–7.

Figure 4:
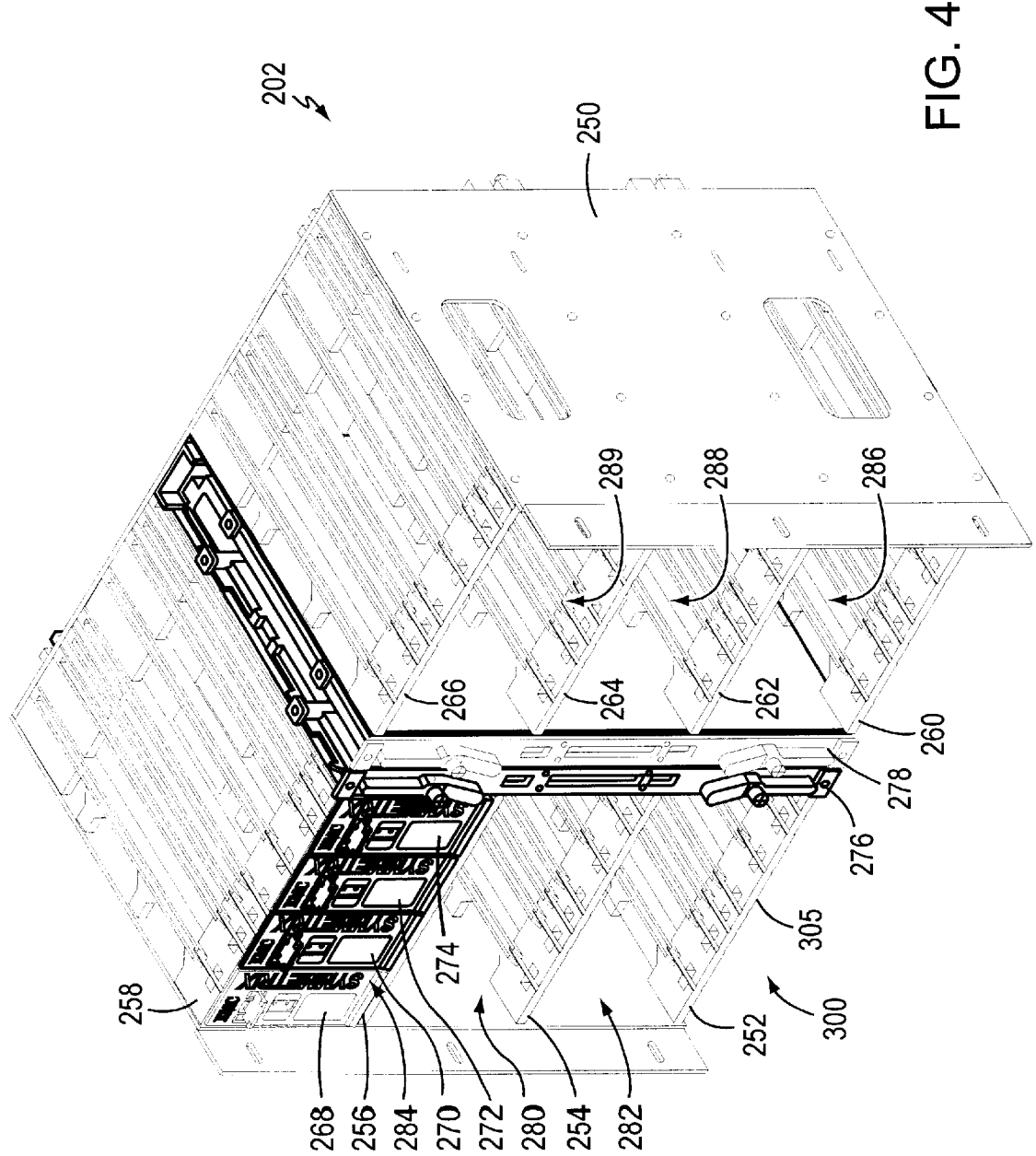
FIG. 4 is a front isometric view of a chassis/electrical cabinet comprised in the mounting system of FIG. 3.
Figure 5:
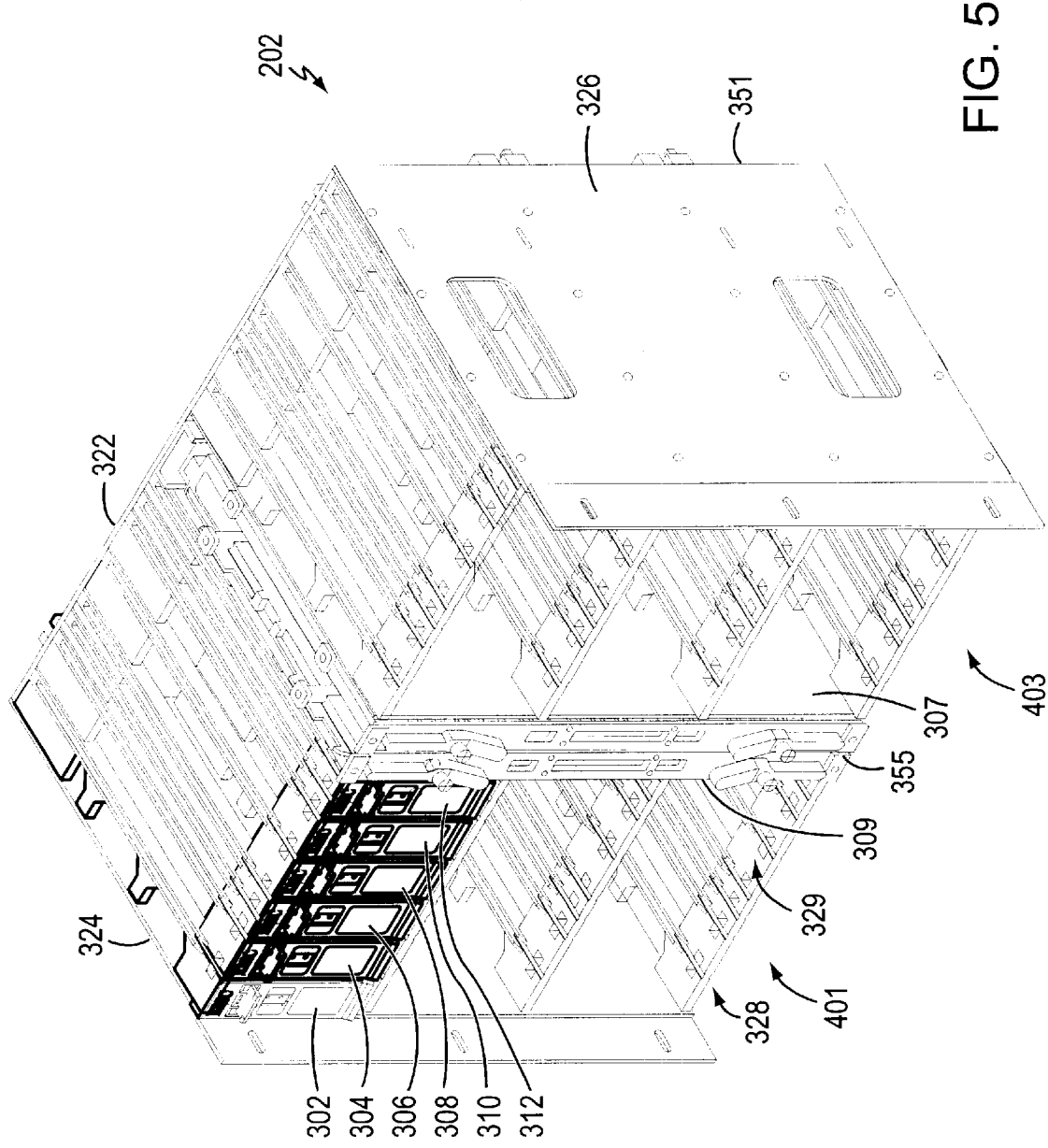
FIG. 5 is another front isometric view of the chassis/cabinet of FIG. 4.

With reference being made to FIGS. 4–5, chassis 202 comprises an electrical cabinet 250 that includes two generally rectangular, identically dimensioned side panels 324, 326 that are mounted by conventional means to a generally rectangular electrical back plane 322. The panels 324, 326 extend parallel to each other and are orthogonal to the back plane 322. Cabinet 250 (see FIG. 4) also includes two generally rectangular, identically dimensioned panels 307, 309 that extend parallel to each other and to the panels 324, 326 in the cabinet 250. Panels 307, 309 are mounted to the back plane 322 and to a plurality of identically constructed racks 252, 254, 256, 258, 260, 262, 264, 266 (whose purpose will be described below) by conventional means (not shown). Racks 252, 254, 256, 258, 260, 262, 264, 266 extend parallel to each other, but are orthogonal to the panels 307, 309, 324, 326 and to the back plane 322.

The back plane 322, side panels 324, 326, and racks 252, 258, 260, 266 of the chassis 202 together partially enclose and define a volume or space 300 for receiving and storing disk devices. Space 300 is internal to the chassis 202, and is segmented by panels 307, 309 into two equal volumes or regions 401, 403. Region 401 is segmented by racks 254 and 256 into three equal volumes or regions 280, 282, 284. Similarly, region 403 is segmented by racks 262 and 264 into three equal volumes or regions 286, 288, 289. Each of the regions 280, 282, 284, 286, 288, 289 may, in turn, be divisible into two equally sized volumes or regions.

Figure 13:
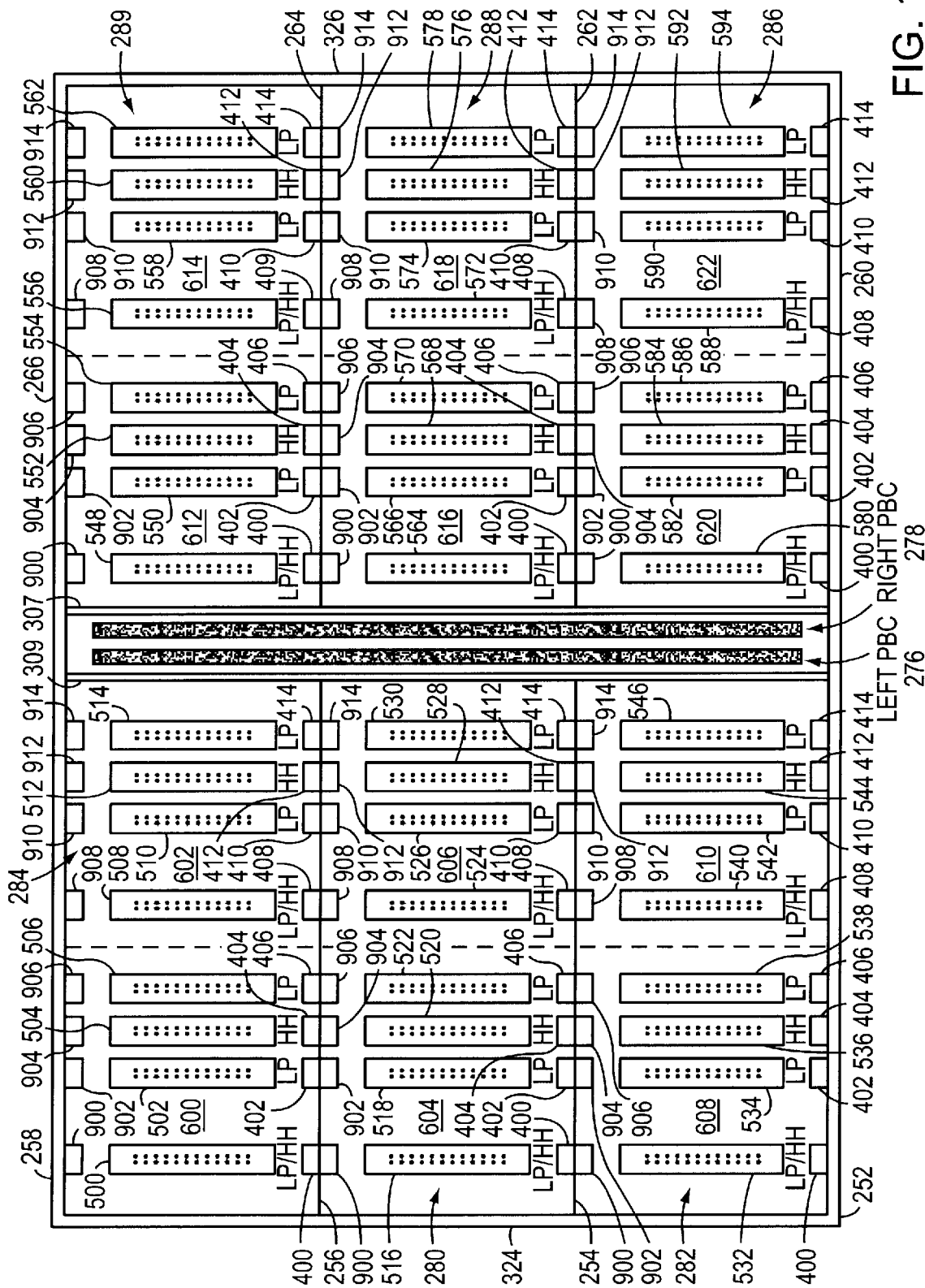
FIG. 13 is a highly schematic diagram illustrating the layout of certain features of the chassis of FIG. 4, and wherein tracks in the top surface of the top rack and in the bottom surface of the bottom rack of the chassis are not shown for purposes of clarity.

For example, as is indicated symbolically by dashed lines in FIG. 13, region 282 may be divided into two equally sized regions 608, 610. Region 280 may be divided into two equally sized regions 604, 606. Region 284 may be divided into two equally sized regions 600, 602. Region 289 may be divided into two equally sized regions 612, 614. Region 288 may be divided into two equally sized regions 616, 618. Region 286 may be divided into two equally sized regions 620, 622.

The respective construction of each of the racks 252, 254, 256, 258, 260, 262, 264, 266 is substantially identical. Accordingly, for purposes of avoiding unnecessary duplication of description, the construction of one 252 of the racks 252, 254, 256, 258, 260, 262, 264, 266 will be described herein.

Figure 6:
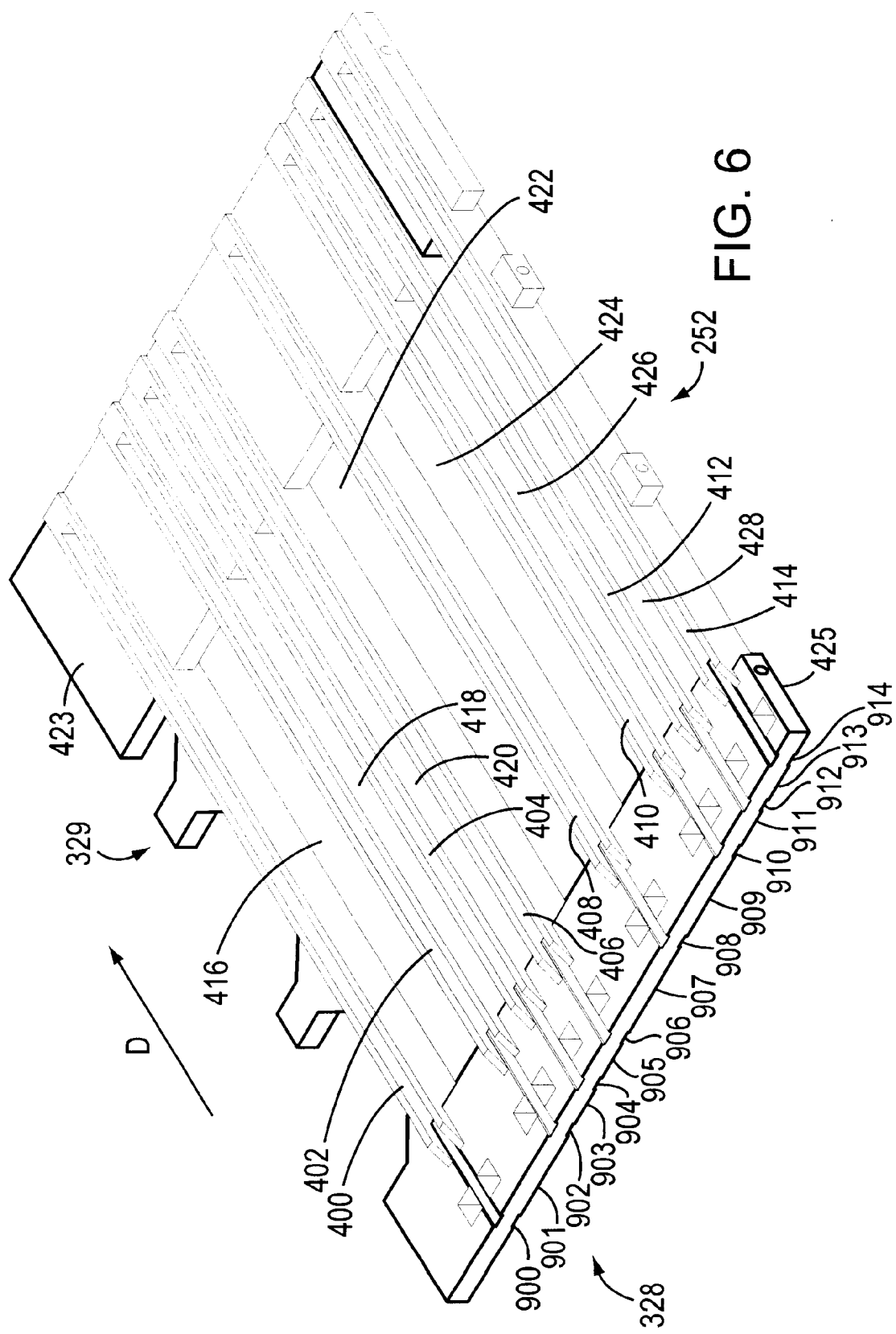
FIG. 6 is a front isometric view of a rack comprised in the chassis/cabinet of FIG. 4.

As shown in FIG. 6, rack 252 includes two respective multiplicities of tracks or slots (collectively referred to by numerals 328 and 329, respectively). Tracks 329 are located in a top surface 423 of the rack 252, and tracks 328 are located in a bottom, oppositely facing surface 425 of the rack 252. Set 329 includes a plurality of tracks or slots 400, 402, 404, 406, 408, 410, 412, 414. Set 328 includes a respective plurality of tracks or slots 900, 902, 904, 906, 908, 910, 912, 914 that are respectively positioned in corresponding positions in surface 425 directly beneath the slots 400, 402, 404, 406, 408, 410, 412, 414 of set 329. Each of the slots 400, 402, 404, 406, 408, 410, 412, 414, 900, 902, 904, 906, 908, 910, 912, 914 extends longitudinally substantially the entire length of the rack 252 from the front 305 of the chassis 202 toward the back plane 322.

The tracks 400, 402, 404, 406, 408, 410, 412, 414 in the top surface 423 of the rack 252 are separated from each other in a transverse direction of the rack 252 by recesses 416, 418, 420, 422, 424, 426, 428. Similarly, the tracks 900, 902, 904, 906, 908, 910, 912, 914 in the bottom surface 425 are separated from each other in the transverse direction of the rack 252 by recesses 901, 903, 905, 907, 909, 911, 913. More specifically, tracks 400, 402 are separated from each other by recess 416, tracks 402, 404 are separated from each other by recess 418, tracks 404, 406 are separated from each other by recess 420, tracks 406, 408 are separated from each other by recess 422, tracks 408, 410 are separated from each other by recess 424, tracks 410, 412 are separated from each other by recess 426, and tracks 412, 414 are separated from each other by recess 428, respectively. Similarly, tracks 900, 902 are separated from each other by recess 901, tracks 902, 904 are separated from each other by recess 903, tracks 904, 906 are separated from each other by recess 905, tracks 906, 908 are separated from each other by recess 907, tracks 908, 910 are separated from each other by recess 909, tracks 910, 912 are separated from each other by recess 911, and tracks 912, 914 are separated from each other by recess 913, respectively.

Figure 7:
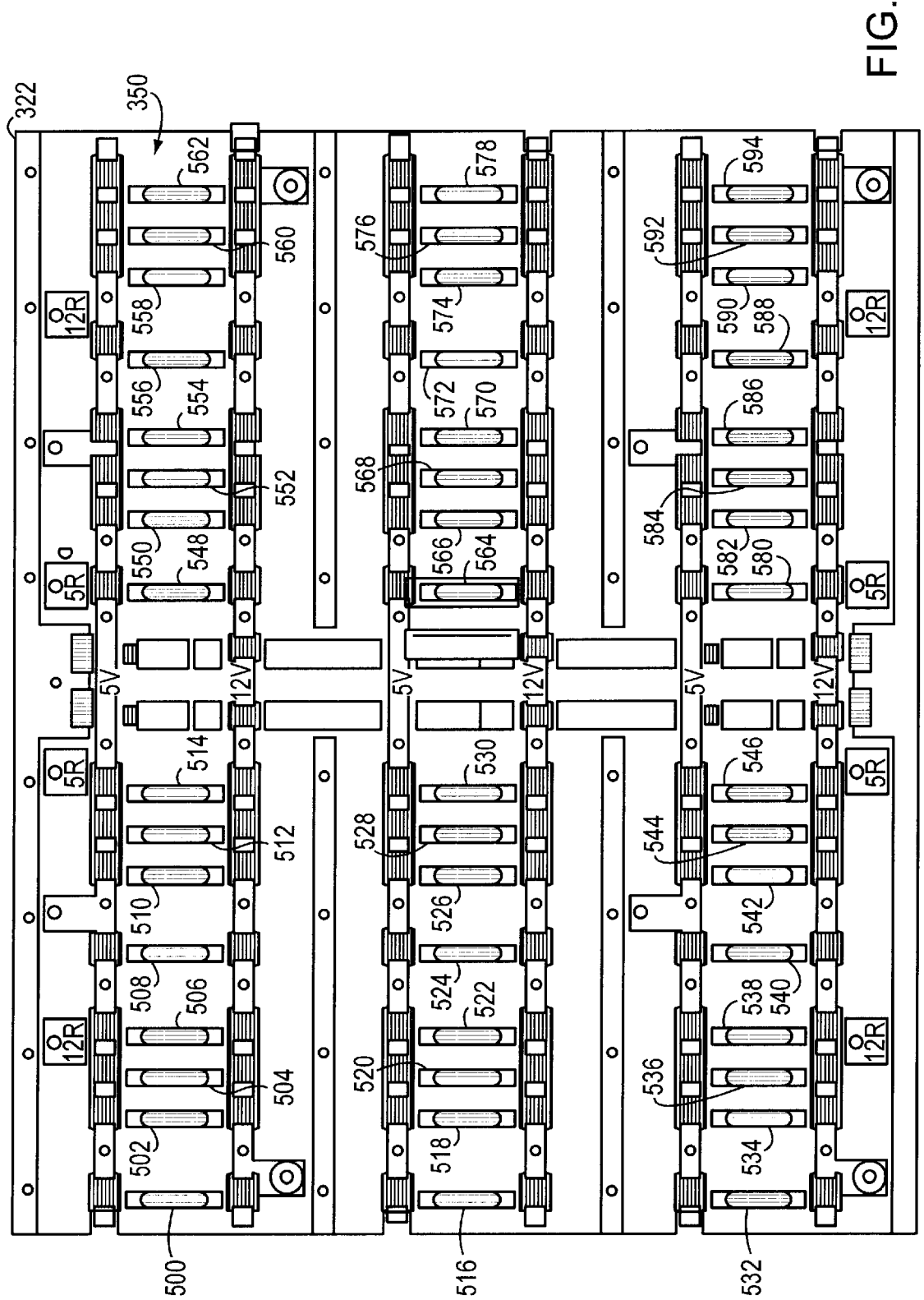
FIG. 7 is a plan view of a portion of the front of a back plane comprised in the mounting system of FIG. 3.

As shown in FIG. 7, back plane 322 includes a front surface 350 that faces toward, and a back surface 351 that faces away from, the front 305 (see FIG. 4) of the chassis 202. Chassis 202 includes a plurality of electromechanical connectors 500, 502, 504, 506, . . . 594 that are mounted in, and extend from the front surface 350 of the back plane 322, into the space 300. More specifically, the connectors 500, 502, 504, 506, . . . 594 are positioned in the chassis 202 such that each of the regions 600, 602, 604, 606, 608, 610, 612, 614, 616, 618, 620, 622 contains four respective connectors (see FIG. 13). As is shown in FIG. 13, region 600 contains connectors 500, 502, 504, 506; region 602 contains connectors 508, 510, 512, 514; region 604 contains connectors 516, 518, 520, 522; region 606 contains connectors 524, 526, 528, 530; region 608 contains connectors 532, 534, 536, 538; region 610 contains connectors 540, 542, 544, 546; region 612 contains connectors 548, 550, 552, 554; region 614 contains connectors 556, 558, 560, 562; region 616 contains connectors 564, 566, 568, 570; region 618 contains connectors 572, 574, 576, 578; region 620 contains connectors 580, 582, 584, 586; and region 622 contains connectors 588, 590, 592, 594.

The connectors 500, 502, 504, 506, . . . 594 are electrically connected via circuit connections (not shown) in the back plane 322 to FC port bypass circuit (PBC) cards 276, 278 (see FIG. 13), which cards 276, 278 are coupled to the back plane 322 by not shown connectors. When disk mass storage devices are mounted in the chassis 202 in the manner that will be described below, the PBC cards 276, 278 may permit, among other things, these disk devices to be electrically coupled to disk adapters in the system 112 such that disk controllers and these disk devices may exchange data and commands using FC protocol-based communication techniques, in accordance with the advantageous teachings disclosed in the aforesaid co-pending U.S. patent application Ser. No. 09/877,848, entitled "Configurable Fibre Channel Loop System," which is being filed concurrently with the subject application. Also when these disk mass storage devices are so mounted in the chassis 202, these disk devices may be assigned addresses in accordance with the advantageous teachings disclosed in the aforesaid co-pending U.S. patent application Ser. No. 09/877,869, entitled "Address Mapping In Mass Storage Device Mounting System," which is being filed concurrently with the subject application. A panel 355 may be mounted to the back plane 322 in-between the panels 307, 309 so as to form respective slots for receiving and housing the respective PBC cards 276, 278. Alternatively, panel 355 need not be included in the system 112 without departing from the present invention.

Each of the disk mass storage devices that may be mounted in chassis 202 is housed in and attached to a respective housing or carrier device. Depending upon the respective form factor of the disk mass storage device (i.e., HH or LP), the carrier housing the respective disk mass storage device may be one of two possible types. For example, the type of carrier (hereinafter "HH carrier") that is used to house an HH device has the construction illustrated in FIGS. 8–10. Conversely, the type of carrier (hereinafter "LP carrier") that is used to house an LP device has the construction illustrated in FIGS. 11–12. That is, each HH device mounted in the chassis 202 may be housed in a respective HH carrier of the type illustrated in FIGS. 8–10, and each LP device mounted in the chassis 202 may be housed in a respective LP carrier of the type illustrated in FIGS. 11–12.

Figure 8:
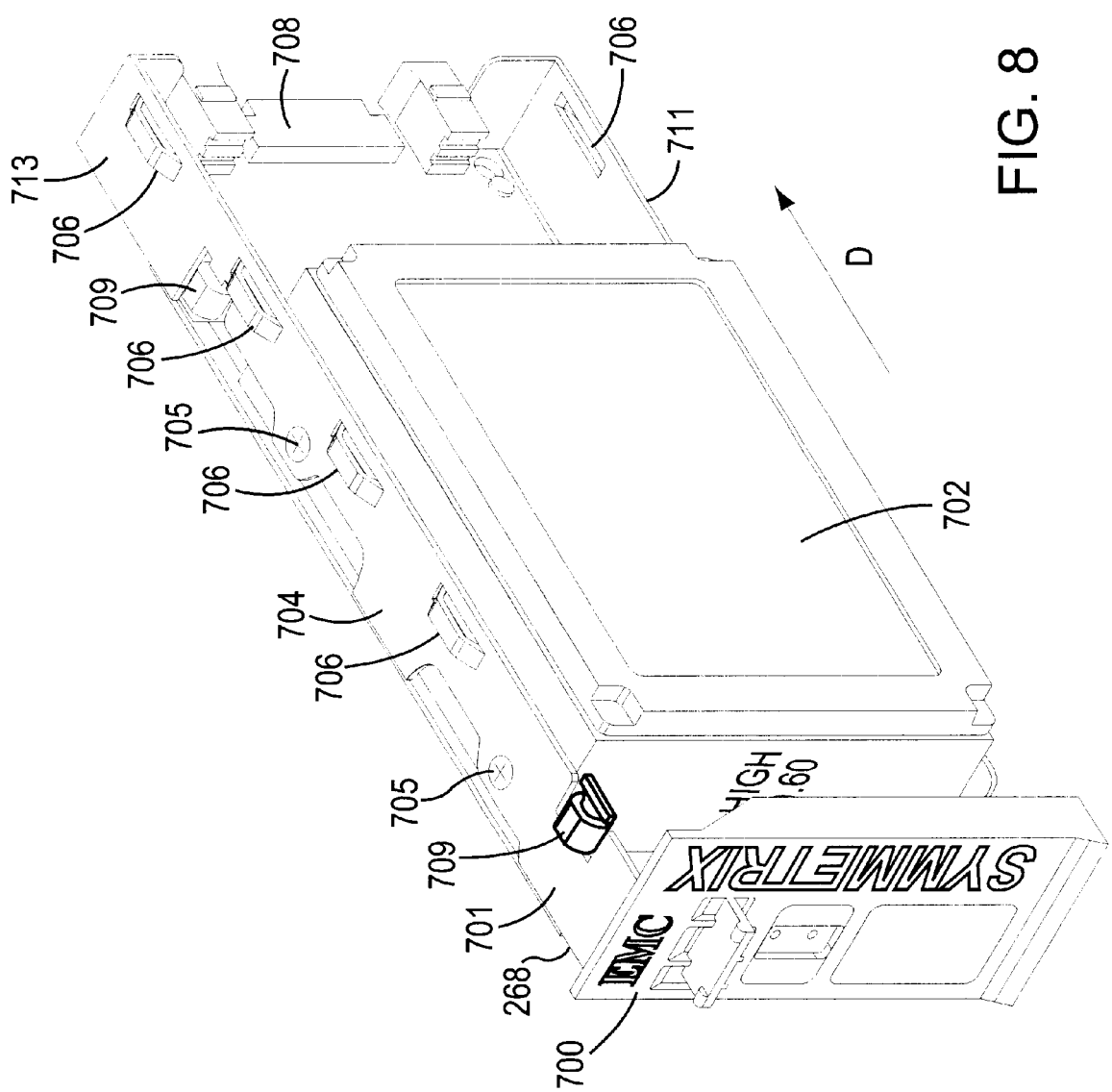
FIG. 8 is a front isometric view of a housing or carrier device that may be used in the chassis/cabinet of FIG. 4, which carrier device is shown attached to and partially enclosing an HH device (i.e., a half-high disk drive unit).
Figure 9:
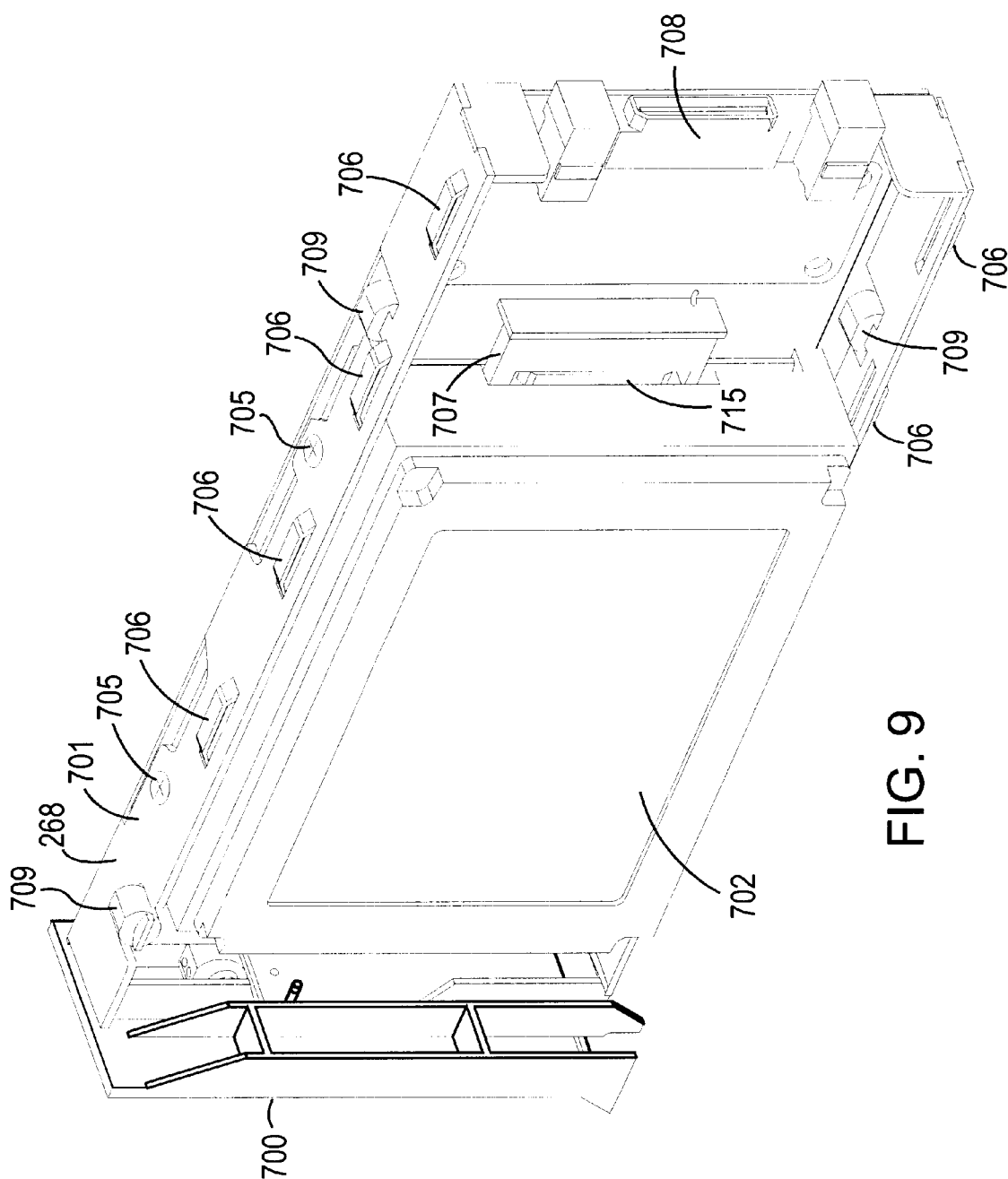
FIG. 9 is a side elevational view of the housing of FIG. 8.
Figure 10:
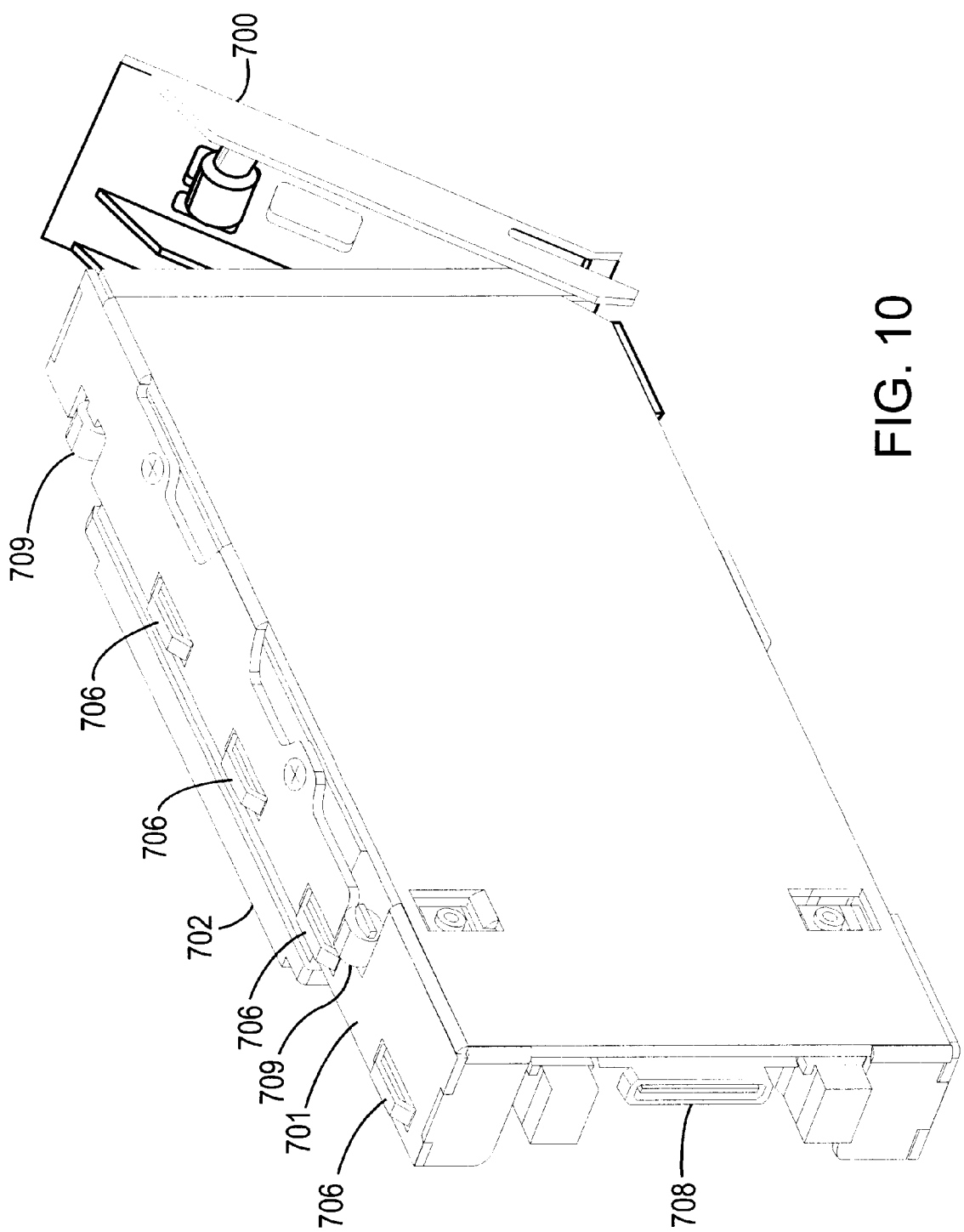
FIG. 10 is a rear isometric view of the housing of FIG. 8, shown with the front lock handle open.

As shown in FIGS. 8–10, an HH carrier (e.g., HH carrier 268) includes a housing 701 to which an HH device (e.g., device 702) may be mounted by conventional means (e.g., screws 705 mounted to the disk drive 702 through oppositely facing sides 711, 713 of the housing 701). Carrier 268 also comprises a conventional lock handle 700. The housing 701 includes four legs (each of which is denoted by numeral 709); respective pairs of the legs 709 are positioned on sides 711, 713, respectively, of the housing 701. A rubber-like, resilient shock-absorbing material is disposed around each of the legs 709 and projects beyond the sides of the housing 701; this rubber-like material acts to dampen coupling to the chassis 202 of vibration generated by the disk drive 702 during operation of the disk drive 702, and thereby also acts to reduce the coupling, through the chassis 202 to other disk drives mounted in the chassis 202, of such vibration. A flexible ribbon-type, or strap-like, electrical cable (not shown) may be used to electrically and mechanically connect the cable's connector plug 707 to a conventional electromechanical connector 708 comprised in the housing 701; the plug 707 may be electrically and mechanically mated to the disk drive's connector plug 715. Additional techniques may also be used to further reduce coupling of vibration generated by the drive 702 through the chassis 202, e.g., techniques of the type disclosed in co-pending U.S. patent application Ser. No. 09/473,668, entitled "Fibre Channel Data Storage System," filed Dec. 29, 1999, which co-pending Application is hereby incorporated herein by reference its entirety.

Housing 701 also includes eight projections or members (each of which is denoted by numeral 706) that extend from surfaces 711, 713. More specifically, four respective projections 706 extend from surface 711, and four respective projections 706 extend from surface 713. Each projection 706 has a respective substantially trapezoidal longitudinal cross-section.

Figure 11:
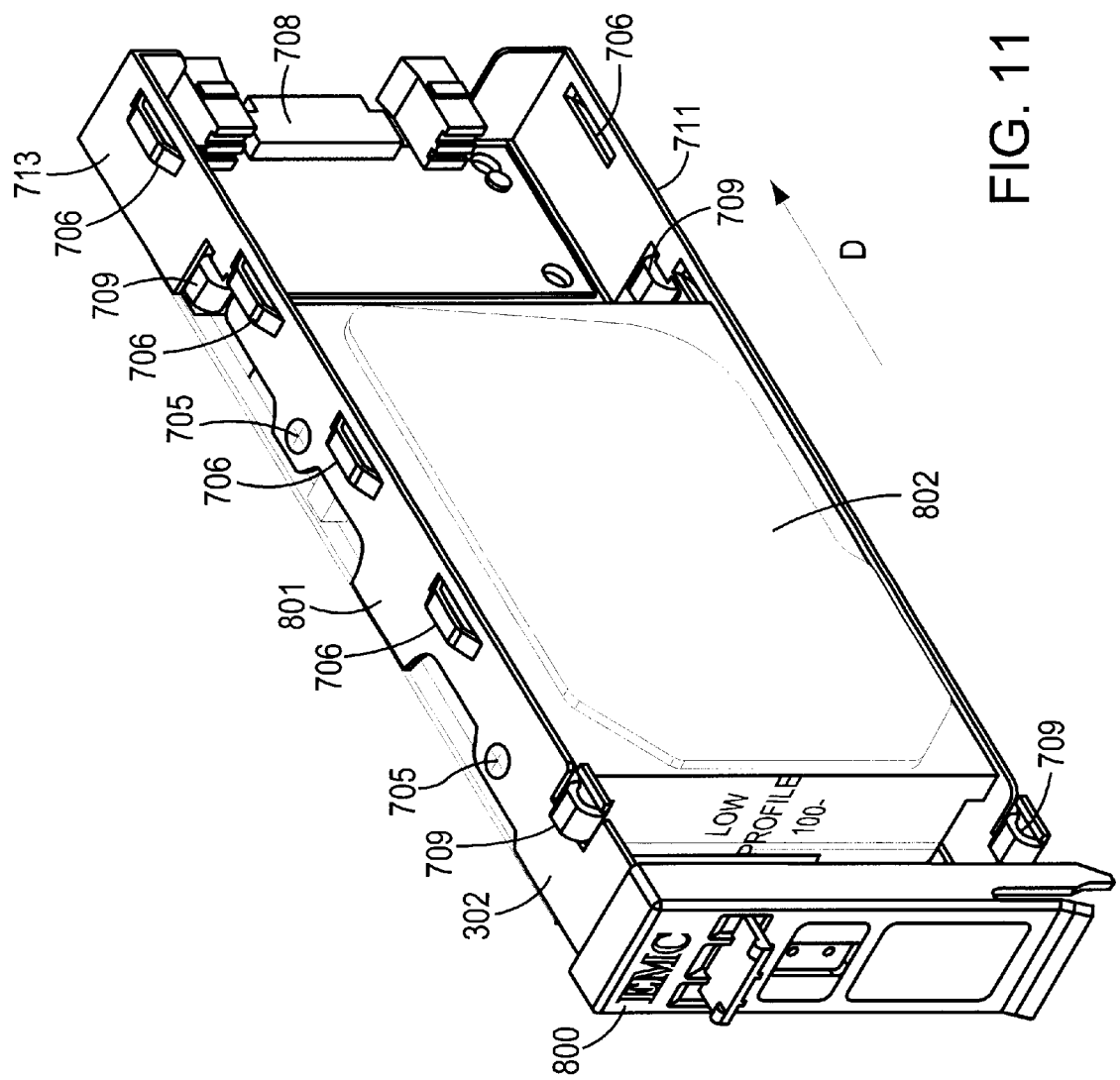
FIG. 11 is a front isometric view of a housing or carrier device that may be used in the chassis/cabinet of FIG. 4, which carrier device is shown attached to and partially enclosing an LP device (i.e., a low profile disk drive unit).
Figure 12:
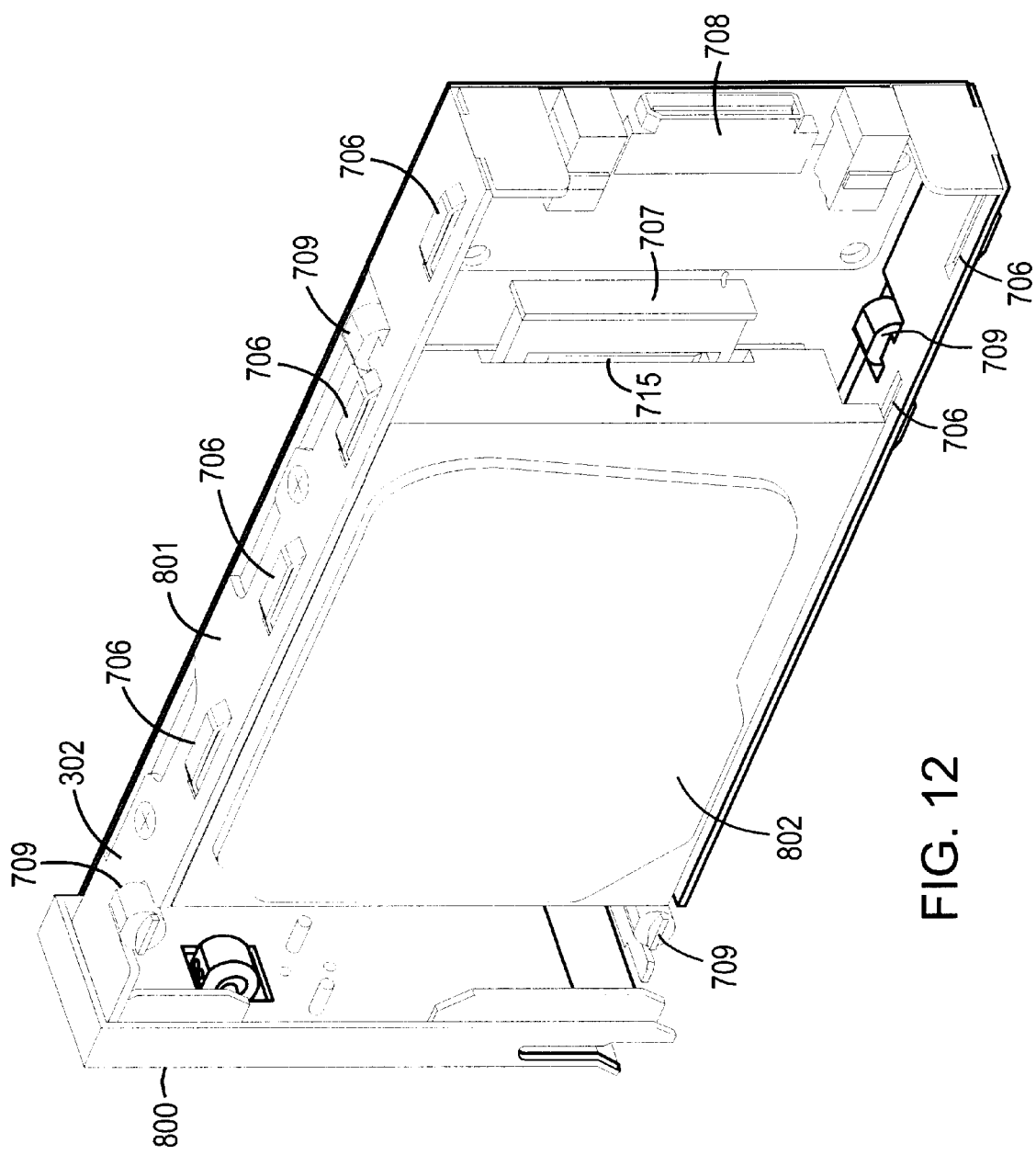
FIG. 12 is a side elevational view of the housing of FIG. 11.

As shown in FIGS. 11–12, an LP carrier (e.g., LP carrier 302) includes a housing 801 to which an LP device (e.g., device 802) may be mounted by conventional means (e.g., screws 705 mounted to the disk drive 802 through oppositely facing sides 711, 713 of the housing 801). Carrier 302 also comprises a conventional lock handle 800. The housing 801 includes four legs (each of which is denoted by numeral 709); respective pairs of the legs 709 are positioned on sides 711, 713, respectively, of the housing 801. A rubber-like, resilient shock-absorbing material is disposed around each of the legs 709 and projects beyond the sides of the housing 801; this rubber-like material acts to dampen coupling to the chassis 202 of vibration generated by the disk drive 802 during operation of the disk drive 802, and thereby also acts to reduce the coupling, through the chassis 202 to other disk drives mounted in the chassis 202, of such vibration. A flexible ribbon-type, or strap-like, electrical cable (not shown) may be used to electrically and mechanically connect the cable's connector plug 707 to a conventional electromechanical connector 708 comprised in the housing 801; the plug 707 may be electrically and mechanically mated to the disk drive's connector plug 715. Additional techniques may also be used to further reduce coupling of vibration generated by the drive 802 through the chassis 202, e.g., techniques of the type disclosed in co-pending U.S. patent application Ser. No. 09/473,668, entitled "Fibre Channel Data Storage System," filed Dec. 29, 1999.

Housing 801 also includes eight projections or members (each of which projections is denoted by numeral 706) that extend from surfaces 711, 713. More specifically, four respective projections 706 that extend from surface 711, and four respective projections 706 extend from surface 713. Each projection 706 has a respective substantially trapezoidal longitudinal cross-section.

With reference now being made to FIGS. 4–6 and 13, with the exception of the top surfaces of the top racks 258, 266 and the bottom surfaces of the bottom racks 252, 260 in chassis 202, each respective track in the top surface of a respective rack may be grouped or associated (e.g., in a respective set or group) with a respective nearest opposing track in the bottom surface of another rack positioned directly above it. For example, track 400 in the top surface 423 of bottom rack 252 may be associated, in a respective set or group, with the opposing track 900 closest to it in the bottom surface of middle rack 254. Track 402 in the top surface 423 of bottom rack 252 may be associated, in a respective set or group, with the opposing track 902 closest to it in the bottom surface of middle rack 254. Track 404 in the top surface 423 of bottom rack 252 may be associated, in a respective set or group, with the opposing track 904 closest to it in the bottom surface of middle rack 254. Track 406 in the top surface 423 of bottom rack 252 may be associated, in a respective set or group, with the opposing track 906 closest to it in the bottom surface of middle rack 254. Track 408 in the top surface 423 of bottom rack 252 may be associated, in a respective set or group, with the opposing track 908 closest to it in the bottom surface of middle rack 254. Track 410 in the top surface 423 of bottom rack 252 may be associated, in a respective set or group, with the opposing track 910 closest to it in the bottom surface of middle rack 254. Track 412 in the top surface 423 of bottom rack 252 may be associated, in a respective set or group, with the opposing track 912 closest to it in the bottom surface of middle rack 254. Track 414 in the top surface 423 of bottom rack 252 may be associated, in a respective set or group, with the opposing track 914 closest to it in the bottom surface of middle rack 254.

Similarly, track 400 in the top surface of middle rack 254 may be associated, in a respective set or group, with the opposing track 900 closest to it in the bottom surface of middle rack 256. Track 402 in the top surface of rack 254 may be associated, in a respective set or group, with the opposing track 902 closest to it in the bottom surface of middle rack 256. Track 404 in the top surface of rack 254 may be associated, in a respective set or group, with the opposing track 904 closest to it in the bottom surface of middle rack 256. Track 406 in the top surface of rack 254 may be associated, in a respective set or group, with the opposing track 906 closest to it in the bottom surface of middle rack 256. Track 408 in the top surface of rack 254 may be associated, in a respective set or group, with the opposing track 908 closest to it in the bottom surface of middle rack 256. Track 410in the top surface of rack 254 may be associated, in a respective set or group, with the opposing track 910 closest to it in the bottom surface of middle rack 256. Track 412 in the top surface of rack 254 may be associated, in a respective set or group, with the opposing track 912 closest to it in the bottom surface of middle rack 256. Track 414 in the top surface of rack 254 may be associated, in a respective set or group, with the opposing track 914 closest to it in the bottom surface of middle rack 256.

Track 400 in the top surface of middle rack 256 may be associated, in a respective set or group, with the opposing track 900 closest to it in the bottom surface of top rack 258. Track 402 in the top surface of rack 256 may be associated, in a respective set or group, with the opposing track 902 closest to it in the bottom surface of rack 258. Track 404 in the top surface of rack 256 may be associated, in a respective set or group, with the opposing track 904 closest to it in the bottom surface of rack 258. Track 406 in the top surface of rack 256 may be associated, in a respective set or group, with the opposing track 906 closest to it in the bottom surface of rack 258. Track 408 in the top surface of rack 256 may be associated, in a respective set or group, with the opposing track 908 closest to it in the bottom surface of rack 258. Track 410 in the top surface of rack 256 may be associated, in a respective set or group, with the opposing track 910 closest to it in the bottom surface of rack 258. Track 412 in the top surface of rack 256 may be associated, in a respective set or group, with the opposing track 912 closest to it in the bottom surface of rack 258. Track 414 in the top surface of rack 256 may be associated, in a respective set or group, with the opposing track 914 closest to it in the bottom surface of rack 258.

Track 400 in the top surface of bottom rack 260 may be associated, in a respective set or group, with the opposing track 900 closest to it in the bottom surface of middle rack 262. Track 402 in the top surface of bottom rack 260 may be associated, in a respective set or group, with the opposing track 902 closest to it in the bottom surface of middle rack 262. Track 404 in the top surface of bottom rack 260 may be associated, in a respective set or group, with the opposing track 904 closest to it in the bottom surface of middle rack 262. Track 406 in the top surface of bottom rack 260 may be associated, in a respective set or group, with the opposing track 906 closest to it in the bottom surface of middle rack 262. Track 408 in the top surface of bottom rack 260 may be associated, in a respective set or group, with the opposing track 908 closest to it in the bottom surface of middle rack 262. Track 410 in the top surface of bottom rack 260 may be associated, in a respective set or group, with the opposing track 910 closest to it in the bottom surface of middle rack 262. Track 412 in the top surface of bottom rack 260 may be associated, in a respective set or group, with the opposing track 912 closest to it in the bottom surface of middle rack 262. Track 414 in the top surface of bottom rack 260 may be associated, in a respective set or group, with the opposing track 914 closest to it in the bottom surface of middle rack 262.

Track 400 in the top surface of middle rack 262 may be associated, in a respective set or group, with the opposing track 900 closest to it in the bottom surface of middle rack 264. Track 402 in the top surface of rack 262 may be associated, in a respective set or group, with the opposing track 902 closest to it in the bottom surface of middle rack 264. Track 404 in the top surface of rack 262 may be associated, in a respective set or group, with the opposing track 904 closest to it in the bottom surface of middle rack 264. Track 406 in the top surface of rack 262 may be associated, in a respective set or group, with the opposing track 906 closest to it in the bottom surface of middle rack 264. Track 408 in the top surface of rack 262 may be associated, in a respective set or group, with the opposing track 908 closest to it in the bottom surface of middle rack 264. Track 410 in the top surface of rack 262 may be associated, in a respective set or group, with the opposing track 910 closest to it in the bottom surface of middle rack 264. Track 412 in the top surface of rack 262 may be associated, in a respective set or group, with the opposing track 912 closest to it in the bottom surface of middle rack 264. Track 414 in the top surface of rack 262 may be associated, in a respective set or group, with the opposing track 914 closest to it in the bottom surface of middle rack 264.

Track 400 in the top surface of middle rack 264 may be associated, in a respective set or group, with the opposing track 900 closest to it in the bottom surface of top rack 266. Track 402 in the top surface of rack 264 may be associated, in a respective set or group, with the opposing track 902 closest to it in the bottom surface of rack 266. Track 404 in the top surface of rack 264 may be associated, in a respective set or group, with the opposing track 904 closest to it in the bottom surface of rack 266. Track 406 in the top surface of rack 264 may be associated, in a respective set or group, with the opposing track 906 closest to it in the bottom surface of rack 266. Track 408 in the top surface of rack 264 may be associated, in a respective set or group, with the opposing track 908 closest to it in the bottom surface of rack 266. Track 410in the top surface of rack 264 may be associated, in a respective set or group, with the opposing track 910 closest to it in the bottom surface of rack 266.

Track 412 in the top surface of rack 264 may be associated, in a respective set or group, with the opposing track 912 closest to it in the bottom surface of rack 266. Track 414 in the top surface of rack 264 may be associated, in a respective set or group, with the opposing track 914 closest to it in the bottom surface of rack 266.

The set of tracks consisting of tracks 400, 900 in racks 256, 258, respectively, may be associated with connector 500, and may be located in the region 600. The set of tracks consisting of tracks 402, 902 in racks 256, 258, respectively, may be associated with connector 502, and may be located in the region 600. The set of tracks consisting of tracks 404, 904 in racks 256, 258, respectively, may be associated with connector 504, and may be located in the region 600. The set of tracks consisting of tracks 406, 906 in racks 256, 258, respectively, may be associated with connector 506, and may be located in the region 600. The set of tracks consisting of tracks 408, 908 in racks 256, 258, respectively, may be associated with connector 508, and may be located in the region 602. The set of tracks consisting of tracks 410, 910 in racks 256, 258, respectively, may be associated with connector 510, and may be located in the region 602. The set of tracks consisting of tracks 412, 912 in racks 256, 258, respectively, may be associated with connector 512, and may be located in the region 602. The set of tracks consisting of tracks 414, 914 in racks 256, 258, respectively, may be associated with connector 514, and may be located in the region 602.

The set of tracks consisting of tracks 400, 900 in racks 254, 256, respectively, may be associated with connector 516, and may be located in the region 604. The set of tracks consisting of tracks 402, 902 in racks 254, 256, respectively, may be associated with connector 518, and may be located in the region 604. The set of tracks consisting of tracks 404, 904 in racks 254, 256, respectively, may be associated with connector 520, and may be located in the region 604. The set of tracks consisting of tracks 406, 906 in racks 254, 256, respectively, may be associated with connector 522, and may be located in the region 604. The set of tracks consisting of tracks 408, 908 in racks 254, 256, respectively, may be associated with connector 524, and may be located in the region 606. The set of tracks consisting of tracks 410, 910 in racks 254, 256, respectively, may be associated with connector 526, and may be located in the region 606. The set of tracks consisting of tracks 412, 912 in racks 254, 256, respectively, may be associated with connector 528, and may be located in the region 606. The set of tracks consisting of tracks 414, 914 in racks 254, 256, respectively, may be associated with connector 530, and may be located in the region 606.

The set of tracks consisting of tracks 400, 900 in racks 252, 254, respectively, may be associated with connector 532, and may be located in the region 608. The set of tracks consisting of tracks 402, 902 in racks 252, 254, respectively, may be associated with connector 534, and may be located in the region 608. The set of tracks consisting of tracks 404, 904 in racks 252, 254, respectively, may be associated with connector 536, and may be located in the region 608. The set of tracks consisting of tracks 406, 906 in racks 252, 254, respectively, may be associated with connector 538, and may be located in the region 608. The set of tracks consisting of tracks 408, 908 in racks 252, 254, respectively, may be associated with connector 540, and may be located in the region 610. The set of tracks consisting of tracks 410, 910 in racks 252, 254, respectively, may be associated with connector 542, and may be located in the region 610. The set of tracks consisting of tracks 412, 912 in racks 252, 254, respectively, may be associated with connector 544, and may be located in the region 610. The set of tracks consisting of tracks 414, 914 in racks 252, 254, respectively, may be associated with connector 546, and may be located in the region 610.

The set of tracks consisting of tracks 400, 900 in racks 264, 266, respectively, may be associated with connector 548, and may be located in the region 612. The set of tracks consisting of tracks 402, 902 in racks 264, 266, respectively, may be associated with connector 550, and may be located in the region 612. The set of tracks consisting of tracks 404, 904 in racks 264, 266, respectively, may be associated with connector 552, and may be located in the region 612. The set of tracks consisting of tracks 406, 906 in racks 264, 266, respectively, may be associated with connector 554, and may be located in the region 612. The set of tracks consisting of tracks 408, 908 in racks 264, 266, respectively, may be associated with connector 556, and may be located in the region 614. The set of tracks consisting of tracks 410, 910 in racks 264, 266, respectively, may be associated with connector 558, and may be located in the region 614. The set of tracks consisting of tracks 412, 912 in racks 264, 266, respectively, may be associated with connector 560, and may be located in the region 614. The set of tracks consisting of tracks 414, 914 in racks 264, 266, respectively, may be associated with connector 562, and may be located in the region 614.

The set of tracks consisting of tracks 400, 900 in racks 262, 264, respectively, may be associated with connector 564, and may be located in the region 616. The set of tracks consisting of tracks 402, 902 in racks 262, 264, respectively, may be associated with connector 566, and may be located in the region 616. The set of tracks consisting of tracks 404, 904 in racks 262, 264, respectively, may be associated with connector 568, and may be located in the region 616. The set of tracks consisting of tracks 406, 906 in racks 262, 264, respectively, may be associated with connector 570, and may be located in the region 616. The set of tracks consisting of tracks 408, 908 in racks 262, 264, respectively, may be associated with connector 572, and may be located in the region 618. The set of tracks consisting of tracks 410, 910 in racks 262, 264, respectively, may be associated with connector 574, and may be located in the region 618. The set of tracks consisting of tracks 412, 912 in racks 262, 264, respectively, may be associated with connector 576, and may be located in the region 618. The set of tracks consisting of tracks 414, 914 in racks 262, 264, respectively, may be associated with connector 578, and may be located in the region 618.

The set of tracks consisting of tracks 400, 900 in racks 260, 262, respectively, may be associated with connector 580, and may be located in the region 620. The set of tracks consisting of tracks 402, 902 in racks 260, 262, respectively, may be associated with connector 582, and may be located in the region 620. The set of tracks consisting of tracks 404, 904 in racks 260, 262, respectively, may be associated with connector 584, and may be located in the region 620. The set of tracks consisting of tracks 406, 906 in racks 260, 262, respectively, may be associated with connector 586, and may be located in the region 620. The set of tracks consisting of tracks 408, 908 in racks 260, 262, respectively, may be associated with connector 588, and may be located in the region 622. The set of tracks consisting of tracks 410, 910 in racks 260, 262, respectively, may be associated with connector 590, and may be located in the region 622. The set of tracks consisting of tracks 412, 912 in racks 260, 262, respectively, may be associated with connector 592, and may be located in the region 622. The set of tracks consisting of tracks 414, 914 in racks 260, 262, respectively, may be associated with connector 594, and may be located in the region 622.

In accordance with this embodiment of the present invention, the respective sets of tracks and their respective associated connectors in each of the respective regions 600, 602, 604, 606, 608, 610, 612, 614, 616, 618, 620, 622, and HH and LP carriers 268, 302 are constructed and dimensioned in such a way as to permit HH carrier 268 and LP carrier 302 to be inserted in and mounted to the chassis 202. More specifically, the carriers 268, 302 and the respective sets of tracks and respective associated connectors in each of the regions 600, 602, 604, 606, 608, 610, 612, 614, 616, 618, 620, 622 are constructed and dimensioned such that a predetermined number of the same type of carrier (i.e., either HH carrier 268 or LP carrier 302) may be inserted and mounted in a respective one (e.g., region 600) of the regions, and if the use of space in the region 600 is to be optimized, only carriers of the same respective type may be contemporaneously inserted and mounted in that respective region 600. However, different types of carriers may be inserted and mounted in different respective regions (e.g., regions 600 and 602). Thus, for example, one such region (e.g., region 600) may receive and store a respective subset of the mass storage devices in chassis 202, which subset may comprise two HH carriers (e.g., carriers 268 and 270), and another region (e.g., region 602) may contemporaneously receive and store another respective subset of the mass storage devices in chassis 202, which subset may comprise three LP carriers (e.g., carriers 308, 310, 312). Thus, since, when system 112 is in use, each of the HH carriers 268, 270 houses a respective HH device (e.g., of the type of HH device 702 in FIG. 8), and each of the LP carriers 308, 310, 312 houses a respective LP device (e.g., of the type of LP device 802 in FIG. 9), the chassis 202 may contemporaneously receive and mount combinations of both HH and LP devices.

In each of the regions 600, 602, 604, 606, 608, 610, 612, 614, 616, 618, 620, 622, the construction and dimensioning of the respective sets of tracks and the respective associated connectors contained therein are respectively identical. Thus, in order to avoid unnecessary duplication of description, the construction and dimensioning of the sets of tracks and associated connectors in a single such region (e.g., region 600) will be described below.

With particular reference being made to FIGS. 8–13 in region 600, the first set of tracks (i.e., as viewed from left to right in FIG. 13) consists of tracks 400, 900 and is associated with connector 500 in the back plane 322. This first set of tracks and associated connector 500 are constructed and dimensioned to receive and mount either an HH device carrier (i.e., a carrier constructed identically to carrier 268) or an LP device carrier (i.e., a carrier constructed identically to carrier 302). That is, the first set of tracks and the carriers 268, 302 are dimensioned and constructed such that, when either of the carriers 268, 302 is appropriately oriented and inserted into the region 600 in an insertion direction D, the feet 709 and projections 706 of that carrier (see FIGS. 8–12) may be received in and engaged by the tracks 400, 900. When the feet 709 and projections 706 of that carrier 268 or 302 are so received in and engaged by tracks 400, 900, the carrier 268 or 302 may be guided by and/or slid along the tracks 400, 900 (when suitable force is applied to the carrier) such that the respective connector 708 of the carrier 268, 302 may be brought into registration with the respective connector 500 that is associated with the first set of tracks. When the connector 708 of the carrier 268 or 302 is so registered with the connector 500, appropriate force may be applied to the carrier 268 or 302 to cause connector 500 to electrically and mechanically mate with the connector 708 of the carrier 268 or 302, and thereby mount the carrier 268 or 302 in and to the chassis 202.

The HH and LP carriers, and the tracks and connectors in the region 600 are constructed and dimensioned such that, when one HH carrier 268 is already mounted to the chassis 202 in region 600, if the use of space in the region 600 is to be optimized, only another HH carrier 270 may be mounted in region 600. In region 600, the feet 709 and projections 706 of this second HH carrier 270 may be received and engaged by the third set of tracks (i.e., the set of tracks consisting of tracks 404, 904) and the connector 708 of carrier 270 may be coupled to the connector 504 associated with the third set of tracks. When the feet 709 and projections 706 of the second HH carrier 270 are received and engaged by the third set of tracks in region 600, the carrier 270 may be guided by and/or slid along the third set of tracks (when suitable force is applied to carrier 270) so as to bring the connector 708 of the carrier 270 into mating registration with the connector 504. Thereafter, by application of appropriate force, the connector 708 and connector 504 may be caused to electrically and mechanically mate with each other to mount the carrier 270 in the chassis 202. After two HH carriers 268, 270 have been mounted in the region 600, no additional HH or LP carriers may be mounted in the region 600.

Conversely, the HH and LP carriers, and the tracks and connectors in the region 600 are constructed and dimensioned such that, when one LP carrier 302 is already mounted to the chassis 202 in region 600, if the use of space in the region 600 is to be optimized, only two additional LP carriers 304, 306 may be mounted in region 600. In region 600, the respective feet 709 and projections 706 of these second and third LP carriers 304, 306 may be received and engaged by the second and fourth sets of tracks (i.e., the sets of tracks consisting of tracks 402, 902 and 406, 906, respectively) and the respective connectors 708 of carriers 304, 306 may be coupled to the connectors 502, 506 that are respectively associated with the second and fourth sets of tracks. When the respective feet 709 and projections 706 of the second and third LP carriers 304, 306 are respectively received and engaged by the second and fourth sets of tracks in region 600, the carriers 304, 306 may be respectively guided by and/or slid along the second and fourth sets of tracks (when suitable forces are applied to carriers 304, 306) so as to bring the respective connectors 708 of the carriers 304, 306 into respective mating registrations with the connectors 502, 506. Thereafter, by application of appropriate respective forces, the respective connectors 708 of the carriers 304, 306 may be caused to electrically and mechanically mate with connectors 502, 506, respectively, to mount the carriers 304, 306 in the chassis 202. After three LP carriers 302, 304, 306 have been mounted in the region 600, no additional HH or LP carriers may be mounted in the region 600.

Thus, when the maximum number of HH carriers are mounted in the region 600, two connectors 502, 506 are not coupled to any carrier devices/disk mass storage devices in region 600. Therefore, when the maximum number of HH carriers are mounted in the chassis 202, twenty-four connectors 502, 506, 510, 514, 518, 522, 526, 530, 534, 538, 542, 546, 550, 554, 558, 562, 566, 570, 574, 578, 582, 586, 590, 594 are not coupled to any carrier devices/disk mass storage devices in the chassis 202.

Conversely, when the maximum number of LP carriers are mounted in the region 600, one connector 504 is not coupled to any carrier device/disk mass storage device in region 600. Thus, when the maximum number of LP carriers are mounted in the chassis 202, twelve connectors 504, 512, 520, 528, 536, 544, 552, 560, 568, 576, 584, 592 are not coupled to any carrier devices/disk mass storage devices in the chassis 202.

Thus, it is evident that there has been provided, in accordance with the present invention, a mass storage device mounting system that fully satisfies the aims and objectives, and achieve the advantages, hereinbefore set forth. The terms and expressions which have been employed in this application are used as terms of description and not of limitation, and there is no intention, in the use of such terms and expressions, of excluding any equivalents of the features shown and described or portions thereof, but it is recognized that various modifications are possible within the scope of the invention as claimed. For example, although the cache 16, disk controllers 18 . . . 20, and host controllers 22 . . . 24 have been described as being coupled via bus system 14, if system 112 is appropriately modified, the cache 16, disk controllers 18 . . . 20, and host controllers 22 . . . 24 may be coupled together and communicate via data transfer and messaging systems of the type disclosed in, e.g., copending U.S. patent application Ser. No. 09/745,814 entitled, "Data Storage System Having Crossbar Switch With Multi-Staged Routing," filed Dec. 21, 2000; this copending application is owned by the Assignee of the subject application, and is hereby incorporated by reference herein in its entirety. Accordingly, the present invention should be viewed broadly as encompassing all modifications, variations, alternatives and equivalents as may be encompassed by the hereinafter-appended claims.

What is claimed is:

1. A mass storage device mounting system that may be used to mount mass storage devices for use in a mass storage system, each of the mass storage devices including a respective disk storage device having a respective form factor that may be a respective one of two different possible form factors, the mounting system comprising:

at least one chassis that includes a plurality of sets of tracks for receiving and engaging the mass storage devices, the sets of tracks being in a cavity space defined by the chassis for receiving the mass storage devices; and a plurality of connectors that may be used to mount the mass storage devices in the mounting system, each set of tracks being associated with a respective connector, the sets of tracks and the connectors being configured such that, when one set of tracks receives and engages one of the mass storage devices, the one mass storage device may be guided by the one set of tracks into mounting connection with a respective connector with which the one set of tracks is associated;

the set of tracks and the connectors being configured so as to permit one or more respective subsets of the mass storage devices to be mounted in one or more respective equally-sized regions included in the cavity space, all of the disk devices in each respective subset of mass storage devices having the same respective form factor;

wherein if the same respective form factor of the disk devices comprised in a given subset of the mass storage devices is one of the two possible form factors, then at most two respective mass storage devices may be comprised in the given subset, and if the same respective form factor of the disk devices comprised in the given subset is the other of the two possible form factors, then at most three respective mass storage devices may be comprised in the given subset; and wherein each chassis includes a rack that separates the cavity space of that chassis into a first space and a second space, wherein the rack defines sets of tracks that extend in a first direction into the first space, and sets of tracks that extend into a second direction into the second space, the second direction being opposite the first direction.

2. A mounting system according to claim 1, wherein if one disk device has the one possible form factor, the one disk device has a height of 1.6 inches, and if the one disk device has the other possible form factor, the height of the one disk device is 1 inch.

3. A mounting system according to claim 1, wherein each respective mass storage device also comprises a respective carrier device that includes two respective mutually oppositely facing surfaces from which extend projections that may be inserted into and engaged by at least certain respective sets of tracks.

4. A mounting system according to claim 1, wherein the connectors are comprised in a back plane of the chassis.

5. A mounting system according to claim 1, wherein a maximum number N of the mass storage devices may be mounted in the mounting system, a number M of the connectors is comprised in the mounting system, and M is greater than N.

6. A mounting system according to claim 1, wherein the chassis comprises at least one set of associated racks, and each set of associated racks defines two respective equally sized regions.

7. A mounting system according to claim 6, wherein the mounting system includes a plurality of chassis, and each chassis includes a plurality of sets of associated racks.

8. A mass storage device mounting system that may be used to mount mass storage devices, each of the mass storage devices including a respective disk storage device having a respective form factor that may be a respective one of two different possible form factors, the mounting system comprising:

a plurality of connectors of number M that may be coupled to the mass storage devices in the mounting system; and a chassis coupled to the plurality of connectors, the chassis including a rack that (i) separates a cavity space of the chassis into a first space and a second space and (ii) defines sets of tracks that extend in a first direction into the first space and sets of tracks that extend into a second direction into the second space, the second direction being opposite the first direction, each set of tracks being configured to guide a mass storage device to one of the plurality of connectors;

wherein the mounting system may mount a maximum number N of mass storage devices, and M is greater than N.

9. A mounting system according to claim 8, wherein the cavity space includes a plurality of equally sized regions, each of the regions is for receiving a respective subset of the mass storage devices, and each of the subsets of the mass storage devices includes respective disk devices of only the same respective form factor.

10. A mounting system according to claim 9, wherein if the same respective form factor of the disk devices comprised in a given subset of the mass storage devices is one of the two possible form factors, then at most two respective mass storage devices may be comprised in the given subset.

11. A mounting system according to claim 9, wherein if the same respective form factor of the disk devices comprised in a given subset of the mass storage devices is one of the two possible form factors, then at most three respective mass storage devices may be comprised in the given subset.

12. A mounting system according to claim 9, wherein the mass storage devices are mounted in a chassis comprised in the mounting system, the chassis comprises at least one set of associated racks, and each set of associated racks defines two of the equally-sized regions.

13. A mass storage device mounting system that may be used to mount mass storage devices, each of the mass storage devices including a respective disk mass storage device having a respective form factor that may be a respective one of two different possible form factors, the mounting system comprising:

at least one chassis having sets of tracks, each set of tracks being configured to guide a mass storage device to a connector, each chassis defining a cavity space for receiving the mass storage devices, the cavity space including a plurality of equally-sized regions, the equally-sized regions each containing a respective subset of the mass storage devices, the respective subsets each comprising respective disk mass storage devices that have only the same respective form factor;

wherein if the same respective form factor of the respective disk devices comprised in a given subset of mass storage devices is one of the two possible form factors, then at most three respective mass storage devices may be comprised in the given subset, and if the same respective form factor of the disk devices comprised in the given subset of the mass storage devices is the other of the two possible form mass storage devices, then at most two respective mass storage devices may be comprised in the given subset; and wherein each chassis includes a rack that separates the cavity space of that chassis into a first space and a second space, wherein the rack defines sets of tracks that extend in a first direction into the first space, and sets of tracks that extend into a second direction into the second space, the second direction being opposite the first direction.

14. A mass storage device mounting system that may be used to mount mass storage devices, each of the mass storage devices including a respective disk storage device having a respective form factor that may be a respective one of two different possible form factors, the mounting system comprising:

at least one chassis having sets of tracks, each set of tracks being configured to guide a mass storage device to a connector, each chassis defining a cavity space for receiving the mass storage devices, the cavity space including a plurality of equally-sized regions, the equally-sized regions each containing a respective subset of the mass storage devices, the respective subsets each comprising respective disk mass storage devices that have only the same respective form factor;

wherein if the same respective form factor of the respective disk devices comprised in a given subset of mass storage devices is one of the two possible form factors, then at most J respective mass storage devices may be comprised in the given subset, and if the same respective form factor of the disk devices comprised in the given subset of the mass storage devices is the other of the two possible form mass storage devices, then at most K respective mass storage devices may be comprised in the given subset, and J is greater than K; and wherein each chassis includes a rack that separates the cavity space of that chassis into a first space and a second space, wherein the rack defines sets of tracks that extend in a first direction into the first space, and sets of tracks that extend into a second direction into the second space, the second direction being opposite the first direction.

15. A mounting system for mounting storage devices, comprising:

a chassis that defines sets of tracks;

a back plane attached to the chassis; and exactly X storage device connectors fastened to the backplane, the chassis defining the sets of tracks such that each set of tracks is configured to receive and guide a storage device to one of the storage device connectors, the chassis being configured to hold a maximum of Y storage devices when holding storage devices exclusively of the first form factor type, and a maximum of Z storage devices when holding a storage devices exclusively of the second form factor type, X being greater than Y, and Y being greater than Z;

wherein the chassis includes a rack that separates a cavity space of that chassis into a first space and a second space, wherein the rack defines sets of tracks that extend in a first direction into the first space, and sets of tracks that extend into a second direction into the second space, the second direction being opposite the first direction.

* * * * *